United States Patent
Suzuki et al.

(10) Patent No.: US 7,561,449 B2
(45) Date of Patent: Jul. 14, 2009

(54) DC-AC CONVERTER AND METHOD FOR PROTECTING DC-AC CONVERTER FROM OVERCURRENT

(75) Inventors: Sadanori Suzuki, Kariya (JP); Hiroaki Asano, Kariya (JP); Kiminori Ozaki, Kariya (JP); Yusuke Yamamoto, Kariya (JP); Takahiro Suzuki, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 150 days.

(21) Appl. No.: 11/837,144

(22) Filed: Aug. 10, 2007

(65) Prior Publication Data
US 2008/0037295 A1 Feb. 14, 2008

(30) Foreign Application Priority Data
Aug. 11, 2006 (JP) .............................. 2006-219534

(51) Int. Cl.
*H02H 7/122* (2006.01)
*H02M 3/335* (2006.01)
(52) U.S. Cl. .................... 363/55; 363/56.03; 363/56.07
(58) Field of Classification Search .............. 363/21.06, 363/21.14, 50, 55, 56.01, 56.02, 56.03, 56.06, 363/56.07, 127; 361/87
See application file for complete search history.

(56) References Cited

U.S. PATENT DOCUMENTS

| 6,671,193 B1 * | 12/2003 | Pelkonen ..................... 363/53 |
| 6,714,428 B2 * | 3/2004 | Huang et al. .................. 363/89 |
| 6,788,554 B2 * | 9/2004 | Havanur .................. 363/21.06 |

FOREIGN PATENT DOCUMENTS

JP  2002-315351  10/2002

* cited by examiner

Primary Examiner—Gary L Laxton
(74) Attorney, Agent, or Firm—Woodcock Washburn LLP

(57) ABSTRACT

A DC-AC converter for converting DC voltage to AC voltage. The converter includes a conversion circuit for converting DC voltage to voltage having a polarity corresponding to AC voltage. A filter circuit receives the converted voltage, smoothes the converted voltage, and outputs the smoothed voltage as AC voltage. A first switch operably connects the voltage conversion circuit and filter circuit. A second switch is arranged between input terminals of the filter circuit. An output current detection circuit detects overcurrent that is greater than a predetermined first threshold. When overcurrent that is greater than the first threshold is detected, the protection circuit stops the supply of power in the voltage conversion circuit, deactivates the first switch, and activates the second switch.

6 Claims, 22 Drawing Sheets

DC-AC CONVERTER AND METHOD FOR PROTECTING DC-AC CONVERTER FROM OVERCURRENT

CROSS-REFERENCE TO RELATED APPLICATIONS

This application is based upon and claims the benefit of priority from the prior Japanese Application No. 2006-219534 filed on Aug. 11, 2006, the entire contents of which are incorporated herein by reference.

FIELD OF THE INVENTION

The present invention relates to a DC-AC converter for converting direct current (DC) voltage to alternating current (AC) voltage and a method for protecting the DC-AC converter from overcurrent.

BACKGROUND OF THE INVENTION

FIG. 22 is a circuit block diagram of an AC inverter described in Japanese Laid-Open Patent Publication No. 2002-315351. One end of a power supply line 210a is connected to a power supply terminal of a DC input unit 210, such as a battery (e.g., a DC 12 V battery). The other end of the power supply line 210a is connected to a DC input filter 230, which may be formed by a choke coil and a capacitor. A switching circuit 240, which is a push-pull circuit, oscillates DC 12 V power from the DC input unit 210 at a frequency of, for example, 55 kHz. The high-frequency oscillation performed by the switching circuit 240 generates a high voltage output (e.g., 140V) in a high voltage coil of a transformer 250. A DC high-voltage rectifier circuit 260 smoothes the waveform of the high-voltage output. Output voltage of the rectifier circuit 260 is supplied to a drive circuit 280 via a DC output line 260a. The drive circuit 280 (an AC inverter circuit) includes, for example, four FETs (field effect transistors) that are connected in an H-bridge with respect to two AC output lines 280a and 280b. The drive circuit 280 generates an AC voltage of, for example, 55 Hz at the AC output lines 280a and 280b by alternately driving two diagonal FETs at a predetermined duty ratio.

A secondary current detection unit outputs a detection signal in accordance with the current at the secondary side based on the potential difference between the two terminals of a shunt resistor connected to the ground side of the drive circuit. When overcurrent is detected, the switching circuit 240 is driven by forcibly setting the duty ratio to a value that is significantly less than the duty ratio required for rated output. Alternatively, in such a case, the supply of power is stopped by deactivating the drive circuit 280 or opening a relay in the power supply line 210a.

However, in the AC inverter described in Japanese Laid-Open Patent Publication No. 2002-315351, the drive circuit 280 alternately drives the FETs in each of the diagonally positioned pairs. Thus, when the shunt resistor is connected to one of the two FETs arranged at the ground side, current is detected only when that FET is activated and cannot be detected when the diagonal FET is activated. Since current cannot be constantly detected, overcurrent may not accurately be detected.

If a shunt resistor is connected to each of the two FETs arranged at the ground side, current flowing through each of these alternately driven FETs may be detected. This would enable constant current detection. However, in this case, two shunt resistors would be necessary. This increases the number of components.

Further, in the AC inverter described in Japanese Laid-Open Patent Publication No. 2002-315351, when overcurrent is detected, a protection operation is performed by just forcibly decreasing the duty ratio of the switching circuit 240. However, there are various levels of overcurrent. For example, the overcurrent may be such that the power supply only needs to be restricted, the power supply must be stopped, or excessive power must be recovered from the load side. Additionally, there may be a case in which accurate overcurrent protection would be difficult just by decreasing the duty in accordance with the detection of overcurrent. Further, Japanese Laid-Open Patent Publication No. 2002-315351 only describes the operation performed during the occurrence of overcurrent by the DC-AC converter that performs conversion three times in the manner of DC→AC→DC→AC.

SUMMARY OF THE INVENTION

The present invention provides a novel DC-AC converter that directly converts input DC voltage to a desired AC voltage in which the DC-AC converter enables an overcurrent protection operation to be performed. Further, the present invention provides a method for protecting a DC-AC converter from overcurrent.

One aspect of the present invention is a device for converting DC voltage to AC voltage. The device has a voltage conversion circuit including a pair of first input terminals and a pair of first output terminals insulated from the pair of first input terminals. The voltage conversion circuit receives the DC voltage with the pair of first input terminals, converts the DC voltage to voltage having a polarity corresponding to the AC voltage, and outputs the converted voltage from the pair of output terminals. A filter circuit includes a pair of second input terminals and a pair of second output terminals. The filter circuit receives the converted voltage with the pair of second input terminals, smoothes the converted voltage, and outputs the smoothed voltage from the pair of second output terminals as the AC voltage. A first switch is arranged between the pair of first output terminals and the pair of second input terminals. The first switch operably connects the voltage conversion circuit and the filter circuit. A second switch is arranged between the pair of second input terminals. An output current detection circuit detects overcurrent that is greater than a predetermined first threshold. When overcurrent that is detected is greater than the first threshold, a protection circuit stops supplying power to the pair of first output terminals from the pair of first input terminals, deactivates the first switch, and activates the second switch.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
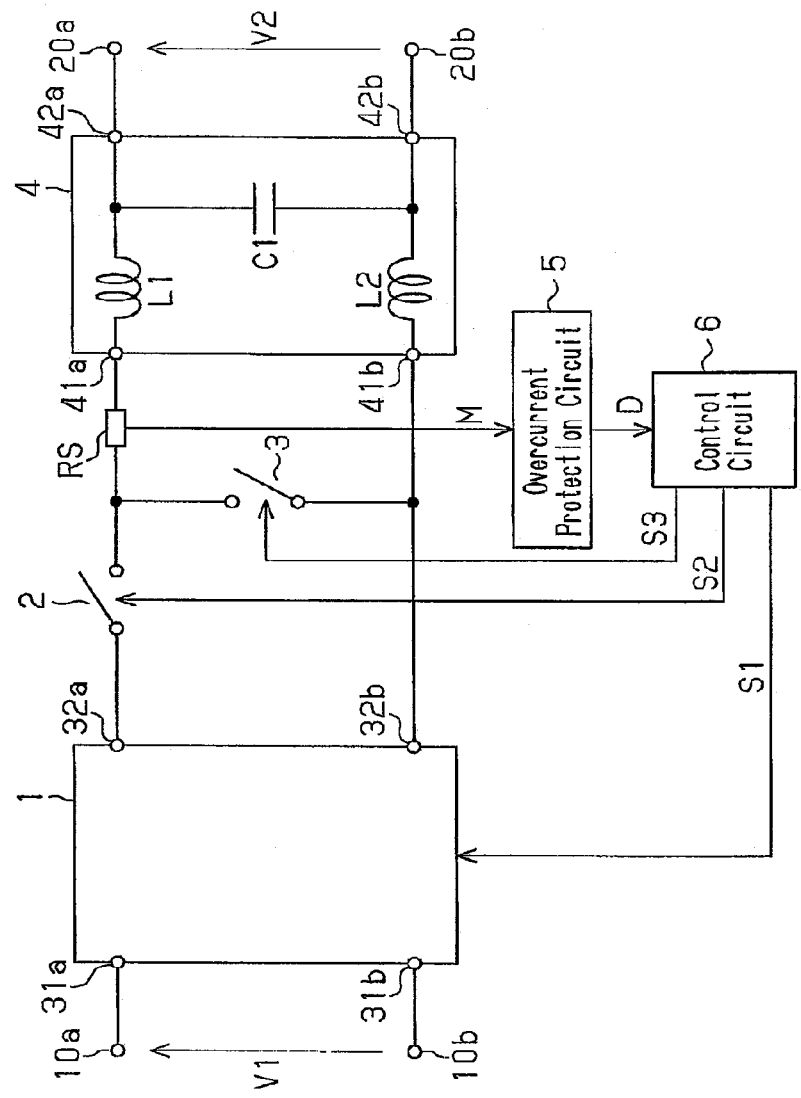
FIG. 1 is a circuit block diagram describing the principle of a DC-AC converter of the present invention.

In the drawings, like numerals are used for like elements throughout.

A DC-AC converter according to a preferred embodiment of the present invention will now be described in detail with reference to FIGS. 1 to 21.

FIG. 1 shows the principle of the DC-AC converter in the present invention. In this DC-AC converter, DC voltage V1 is input to DC input terminals 10a and 10b, and AC voltage V2 is output from AC output terminals 20a and 20b. The DC input terminals 10a and 10b are connected to input terminals 31a and 31b of a voltage conversion circuit 1. One of the output terminals 32a and 32b of the voltage conversion circuit 1 is connected to one of input terminals 41a and 41b of a filter circuit 4 via a first switch 2 (first switch circuit). The other one of the output terminals 32a and 32b of the voltage conversion circuit 1 is directly connected to the other one of the input terminals 41a and 41b of the filter circuit 4. A second switch 3 (second switch circuit) is connected between the input terminals 41a and 41b of the filter circuit 4. Output terminals 42a and 42b of the filter circuit 4 are connected to the AC output terminals 20a and 20b.

In the voltage conversion circuit 1, the input terminals 31a and 31b are electrically insulated from the output terminals 32a and 32b. Accordingly, direct current does not flow from the input terminals 31a and 31b to the output terminals 32a and 32b. The voltage conversion circuit 1 converts the DC voltage V1 applied to the input terminals 31a and 31b to voltage having a polarity determined in accordance with the polarity of the AC voltage V2 and outputs the converted voltage from the output terminals 32a and 32b.

The filter circuit 4 is a typical filter having a coil L1 connected between the input terminal 41a and the output terminal 42a, a coil L2 connected between the input terminal 41b and the output terminal 42b, and an output capacitor C1 connected between the output terminals 42a and 42b.

When voltage having polarity that is in accordance with the desired AC is output from the output terminals 32a and 32b and the first switch 2 is activated, the voltage at the output terminals 32a and 32b of the voltage conversion circuit 1 is applied to the input terminals 41a and 41b of the filter circuit 4. When the second switch 3 is activated, the voltage at the output terminals 32a and 32b of the voltage conversion circuit 1 is not applied to the input terminals 41a and 41b of the filter circuit 4. In this case, a current flow path is formed in the filter circuit 4. The filter circuit 4 smoothes the voltage applied to the input terminals 41a and 41b and outputs the smoothed voltage from the output terminals 42a and 42b. The voltage at the output terminals 42a and 42b of the filter circuit 4 is controlled by adjusting the ratio of the period during which the first switch 2 is activated and the period during which the second switch 3 is activated. The polarity of the voltage at the output terminals 42a and 42b of the filter circuit 4 is controlled by changing the polarity of the voltage output from the output terminals 32a and 32b of the voltage conversion circuit 1.

A sense resistor RS is arranged between one of the input terminals 41 of the filter circuit 4 and a connecting point between the first switch 2 and the second switch 3. The current sense resistor RS is cable of constantly detecting the output current of the DC-AC converter. The current sense resistor RS generates and provides a current detection signal M to an overcurrent protection circuit 5. The overcurrent protection circuit generates and provides an overcurrent detection signal D to a control circuit 6. The control circuit 6 controls the voltage conversion circuit 1, the first switch 2, and the second switch 3 with control signals C1, C2, and C3, respectively.

Figure 2:
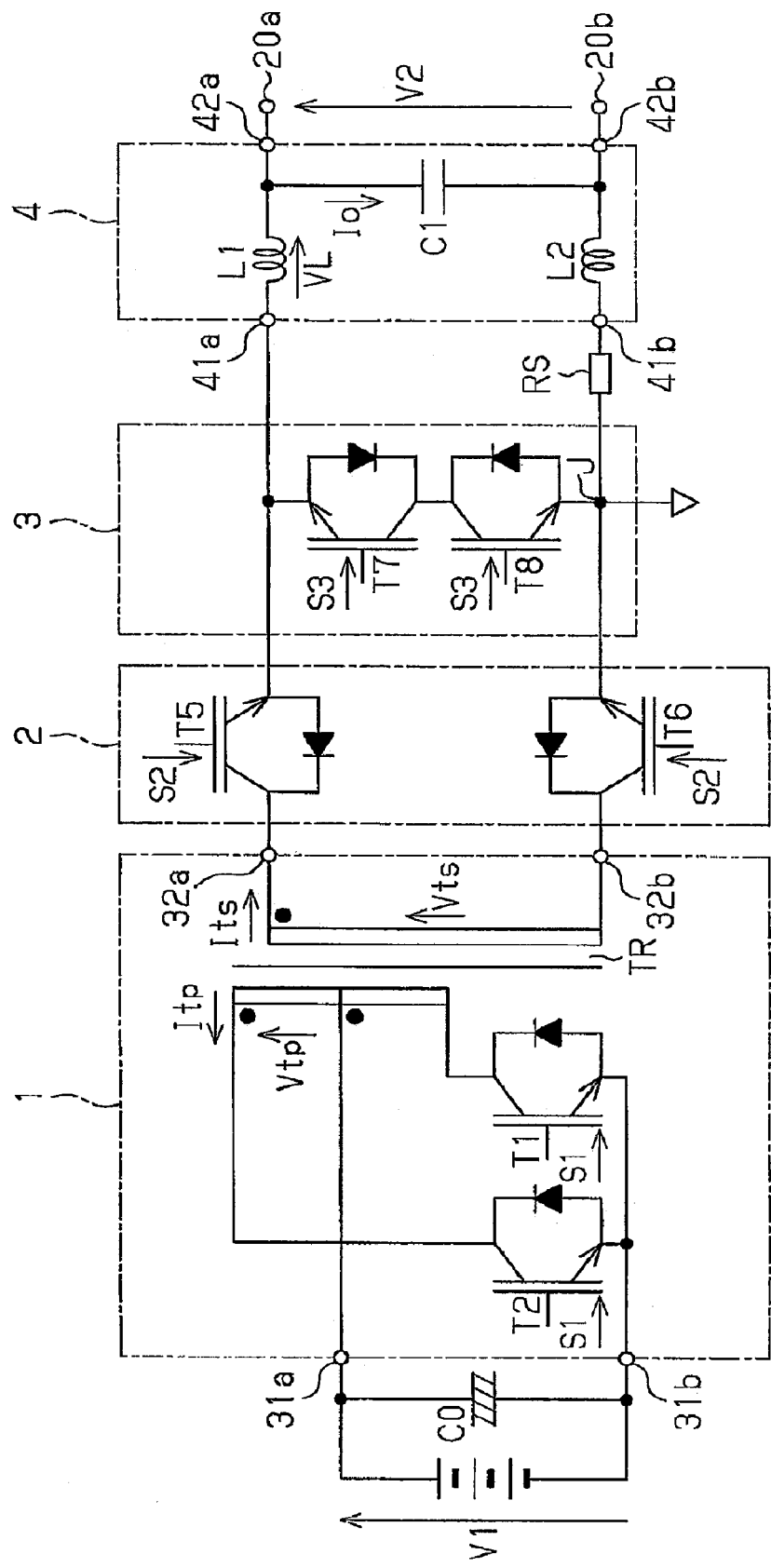
FIG. 2 is a schematic circuit block diagram of a DC-AC converter according to a preferred embodiment of the present invention.

FIG. 2 is a block circuit diagram of the DC-AC converter according to the preferred embodiment of the present invention. The voltage conversion circuit 1 includes a transformer TR, which includes a primary coil, a secondary coil, and insulated gate bipolar transistor (IGBT) elements T1 and T2. The primary coil of the transformer TR includes first and second coils and a center tap connecting the first and second coils. The IGBT elements T1 and T2 each include an anti-parallel diode. The IGBT elements T1 and T2 have emitter terminals that are connected to each other. The IGBT element T1 has a collector terminal connected to one terminal of the first coil in the primary coil. The IGBT element T2 has a collector terminal connected to one terminal of the second coil in the primary coil. The center tap connects the other terminal of the first coil and the other terminal of the second coil. A smoothing capacitor C0 is connected between the emitter terminals of the IGBT elements T1 and T2 and the center tap of the transformer TR. The DC voltage V1 is supplied to the emitter terminals of the IGBT elements T1 and T2 that function as a negative side. The IGBT elements T1 and T2 form a push-pull circuit. The control signal C1 is provided to the control terminals of the IGBT elements T1 and T2. The control signal C1 includes a plurality of control signals that independently activate and deactivate the IGBT elements T1 and T2. That is, the control signal C1 generated voltage having any polarity at the output terminals 32a and 32b of the voltage conversion circuit 1 and stops the supply of power.

An IGBT element T5 has a collector terminal connected to one terminal of the secondary coil of the transformer TR. An IGBT element T6 has a collector terminal connected to the other terminal of the secondary coil of the transformer TR. The IGBT element T5 has an emitter terminal connected to one terminal of the coil L1 of the filter circuit 4. The IGBT element T6 has an emitter terminal connected to one terminal of the coil L2 of the filter circuit 4 via the current sense resistor RS. The IGBT elements T5 and T6 form the first switch 2. Each of the IGBT elements T5 and T6 is a semiconductor switching element having an anti-parallel diode. The first switch 2 maintains a deactivated state between the output terminals 32a and 32b of the voltage conversion circuit 1 and the input terminals 41a and 41b of the filter circuit 4 regardless of the polarity of the voltage at the output terminals 32a and 32b of the voltage conversion circuit 1.

The emitter terminal of an IGBT element T7 is connected to a path connecting the emitter terminal of the IGBT element T5 and one terminal of the coil L1. The emitter terminal of an IGBT element T8 is connected to a path connecting the emitter terminal of the IGBT element T6 and the current sense resistor RS. The IGBT elements T7 and T8 are connected in series with their collector terminals being connected to each other. The IGBT elements T7 and T8 form the second switch 3. Each of the IGBT elements T7 and T8 is a semiconductor switching element having an anti-parallel diode. The second switch 3 maintains a deactivated state between the input terminals 41a and 41b of the filter circuit 4.

The emitter terminals of the IGBT elements T6 and T8 are connected to each other at a connecting point J, at which the potential is equal to the ground potential. The current sense resistor RS is connected between the connecting point J and the coil L2. The current sense resistor RS corresponds to an output current detection circuit.

In the same manner as shown in FIG. 1, the DC-AC converter of FIG. 2 includes the overcurrent protection circuit 5 and the control circuit 6. However, these circuits are not shown in FIGS. 2 to 16 and 19 to 21.

The circuit operation of the DC-AC converter of the preferred embodiment (FIG. 2) will now be described stage-by-stage with reference to FIGS. 3 to 16. The circuit operation of the DC-AC converter during a voltage raising period of the AC voltage V2 will first be described with reference to FIGS. 3 to 8. The DC-AC converter generates the AC voltage V2 by switching the IGBT elements T1, T2, T5, T6, T7, and T8 at a frequency that is sufficiently higher than the frequency of the AC voltage V2 and controlling the on duty of the IGBT elements T1, T2, T5, and T6.

The operation of the switching control performed with the IGBT elements T1, T2, and T5 to T8 during a single cycle is shown stage-by-stage in FIGS. 3 to 8.

Figure 3:
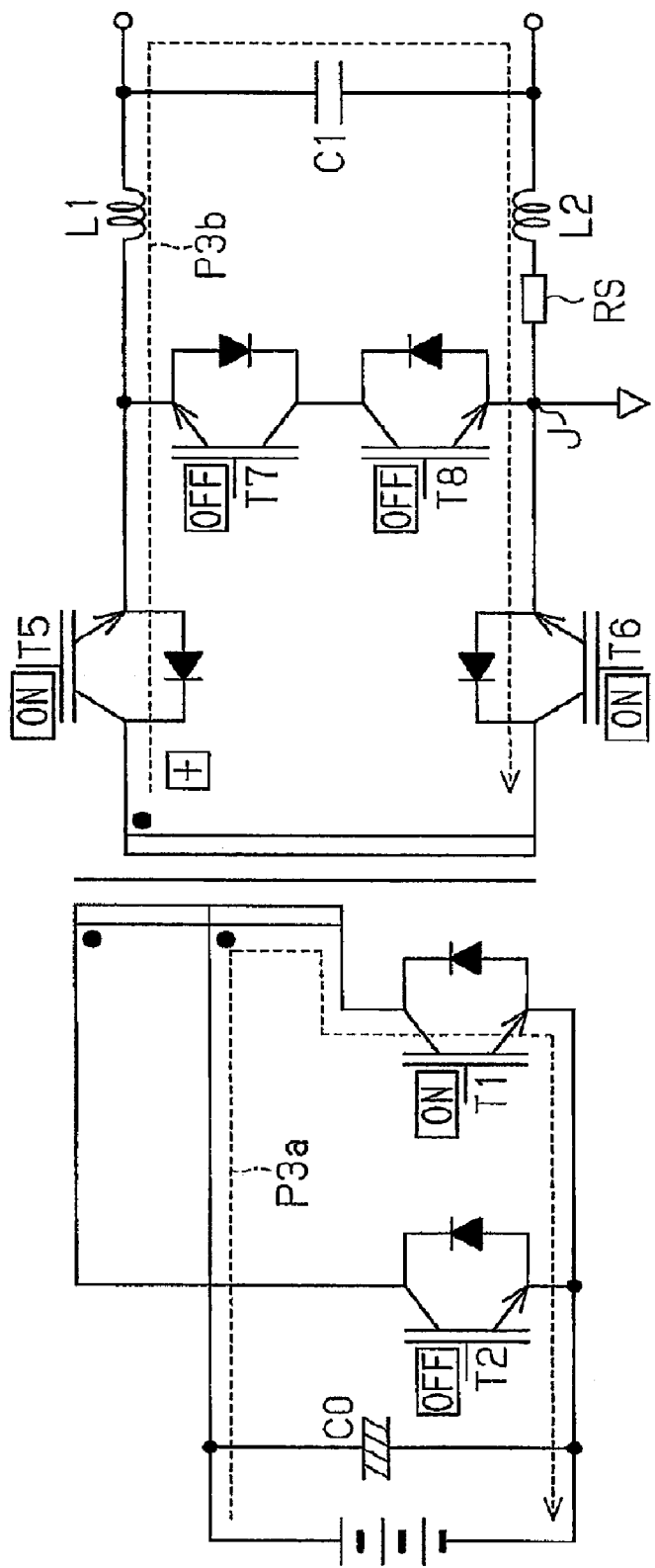
FIG. 3 shows the DC-AC converter of FIG. 3 in operation state (1) of during a voltage raising period.

In operation state (1) shown in FIG. 3, the IGBT element T1 is activated in a state in which the IGBT elements T5 and T6 are activated. This applies DC voltage V1 to the first coil of the primary coil via the center tap of the transformer TR. As indicated by the arrow P3a, current flows from the positive pole of the DC voltage V1 toward the negative pole of the DC voltage V1 via the center tap and the IGBT element T1. This current excites the transformer TR and induces voltage that causes the potential at a reference terminal (a terminal connected to the collector terminal of the IGBT element T5) of the secondary coil to be positive. As a result, as indicated by the arrow P3b, current flows through a path extending from the reference terminal of the secondary coil through the IGBT element T5, the coil L1, the output capacitor C1 and/or a load (not shown), the coil L2, the anti-parallel diode of the IGBT element T6, and back to the secondary coil.

This causes the AC voltage V2, which is the voltage between the terminals of the output capacitor C1, to rise as time elapses. Further, output current directed toward an output capacitor C1 and/or a load (not shown) from the transformer TR flows through the current sense resistor RS. This current is detected.

In the voltage raising period of the AC voltage V2, operation state (1) of FIG. 3 occupies a large portion of the operation period in the single cycle shown in FIGS. 3 to 8.

The IGBT elements T5 and T6 are activated before the IGBT element T1 is activated. Thus, no turn-on loss is generated when current starts flowing from the transformer TR through the coils L1 and L2.

Figure 4:
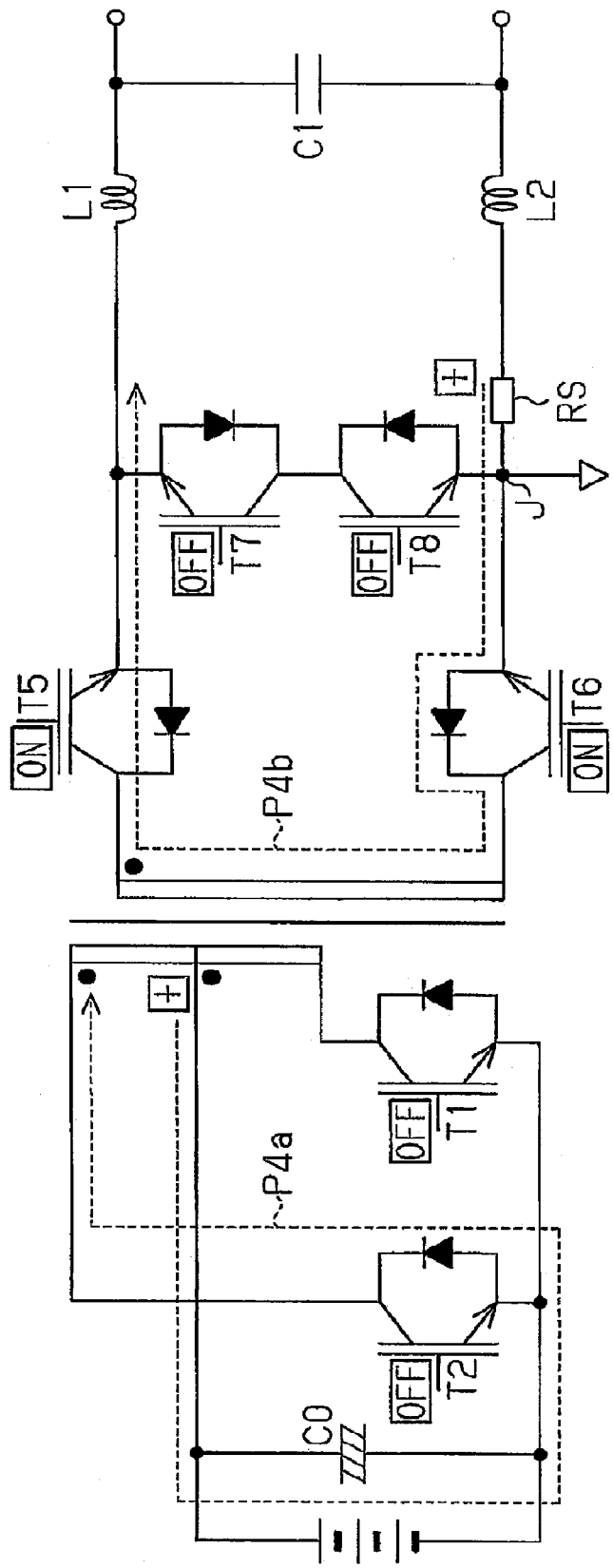
FIG. 4 shows the DC-AC converter of FIG. 3 in operation state (2) during the voltage raising period.

In operation state (2) shown in FIG. 4, the IGBT element T1 is deactivated. As a result, the continuity of the excitation current of the transformer TR causes current to flow through a path extending from the center tap of the transformer TR through the power supply of the DC voltage V1, the anti-parallel diode of the IGBT element T2, and back to the primary coil as indicated by the arrow P4a.

At the same time, the continuity of the current flowing through the coils L1 and L2 causes current to flow through a closed circuit formed by the coil L2, the anti-parallel diode of the IGBT element T6, the secondary coil of the transformer TR, the IGBT element T5, the coil L1, and the output capacitor C1 and/or the load (not shown) as indicated by the arrow P4b. Current superimposed on the current generated by the excitation energy of the transformer TR causes energy to accumulate in the coils L1 and L2. Current in which the current generated by the excitation energy of the transformer TR is superimposed on the current generated by the energy accumulated in the coils L1 and L2 flows through the primary coil of the transformer TR. This regenerates some of the energy accumulated in the coils L1 and L2 so that the energy is used as power for the DC voltage V1. The remaining energy accumulated in the coils L1 and L2 moves to the output capacitor C1. This continuously charges the output capacitor C1 and continuously raises the AC voltage V2. The output current directed toward the output capacitor C1 and/or the load flows through the current sense resistor RS. This current is detected.

Figure 5:
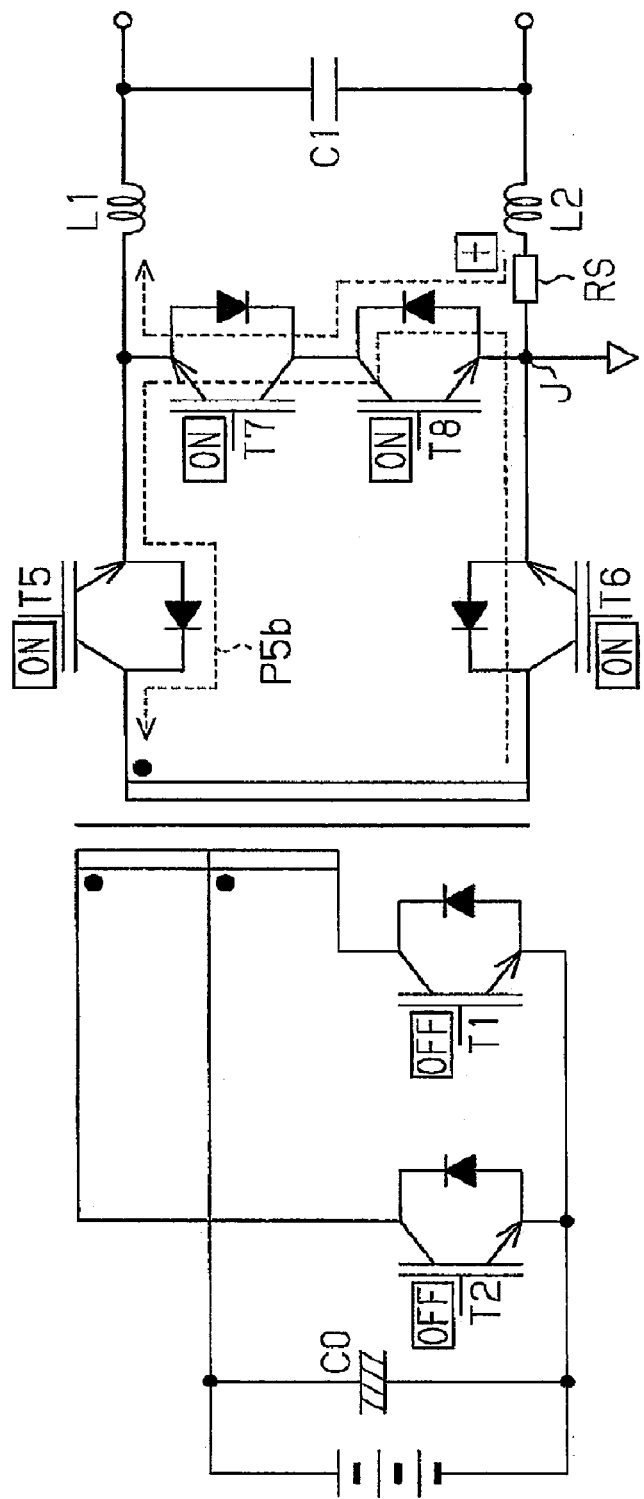
FIG. 5 shows the DC-AC converter of FIG. 3 in operation state (3) during the voltage raising period.

In operation state (3) shown in FIG. 5, the IGBT elements T7 and T8 are activated in a state in which the IGBT elements T5 and T6 are activated. Coil current continuously flows from the coil L2 to the coil L1 via the current sense resistor RS, the anti-parallel diode of the IGBT element T8, and the IGBT element T7. Some of the energy accumulated in the coils L1 and L2 sequentially moves to the output capacitor C1. This continuously charges the output capacitor C1 and continuously raises the AC voltage V2. The output current directed toward the output capacitor C1 and/or the load flows through the current sense resistor RS. This current is detected.

At the same time, the excitation current of the transformer TR flows through the secondary coil instead of the primary coil. More specifically, the excitation current of the transformer TR flows through a path extending from the IGBT element T6 through the anti-parallel diode of the IGBT element T8, the IGBT element T7, and the anti-parallel diode of the IGBT element T5, and back to the secondary coil as indicated by the arrow P5b. This is because the activation of the IGBT elements T7 and T8 short-circuits the secondary coil of the transformer TR.

When the IGBT element T8 is switched from a deactivated state to an activated state, the anti-parallel diode of the IGBT element T8 keeps the collector-emitter voltage of the IGBT element T8 substantially uniform. Thus, no switching loss occurs when the IGBT element T8 is activated.

The DC-AC converter of the preferred embodiment maintains the continuity of the current flowing through the coils of the circuit in the operation states (2) and (3) shown in FIGS. 4 and 5, that is, during the shifting period from operation state (1) shown in FIG. 3 to operation state (4) shown in FIG. 6, which will be described later. It is preferred that the periods of operation states (2) and (3) be as short as possible.

Figure 6:
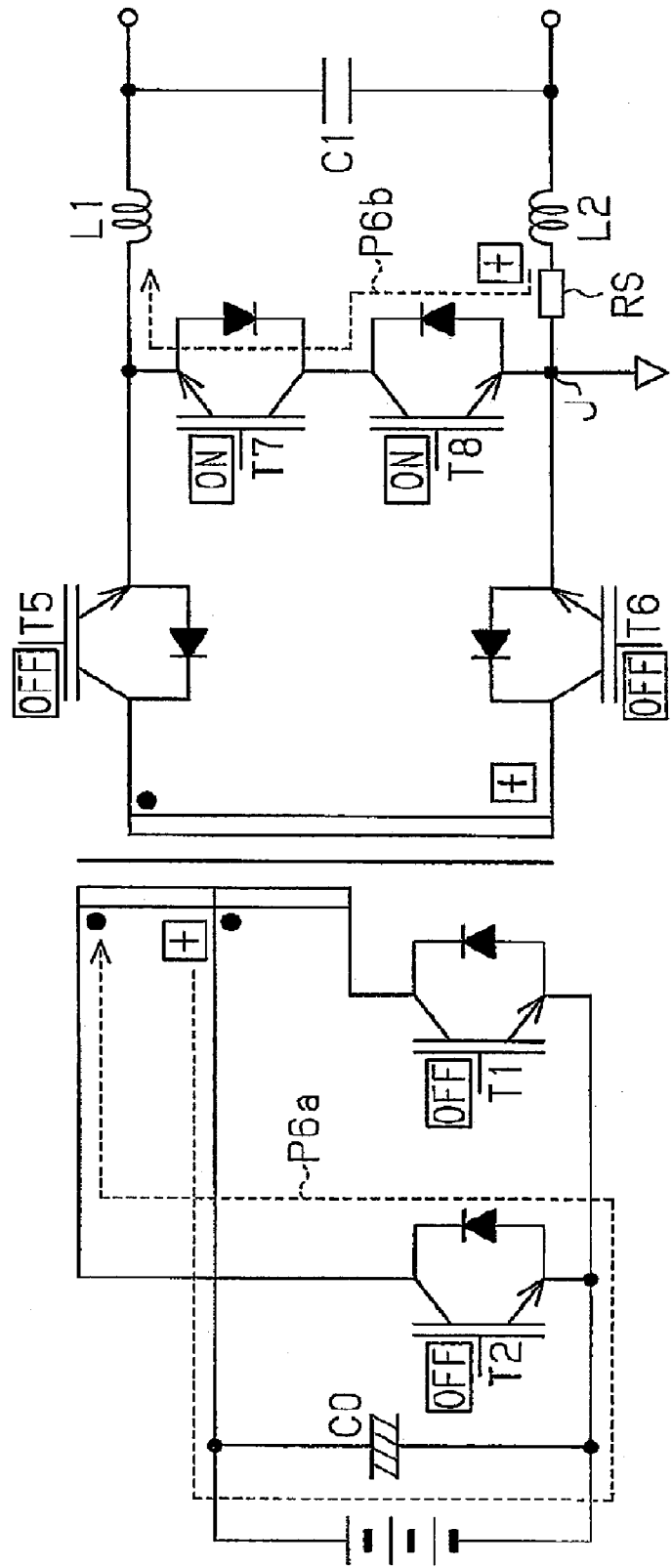
FIG. 6 shows the DC-AC converter of FIG. 3 in operation state (4) during the voltage raising period.

In operation state (4) shown in FIG. 6, the IGBT elements T5 and T6 are deactivated in a state the IGBT elements T7 and T8 are activated. As indicated by the arrow P6a, the current flowing through the coils L1 and L2 continuously flows through a closed circuit formed by the coil L1, the output capacitor C1 and/or the load (not shown), the coil L2, the anti-parallel diode of the IGBT element T8, and the IGBT element T7. This continuously charges the output capacitor C1 and continuously raises the AC voltage V2. The output current directed toward the output capacitor C1 and/or the load (not shown) flows through the current sense resistor RS. This current is detected.

In this state, as shown by arrow P6a, the current generated by the excitation energy of the transformer TR flows through a closed circuit extending from the center tap of the primary coil through the power supply of the DC voltage V1 and the anti-parallel diode of the IGBT element T2 and back to the primary coil. The transformer TR is reset when there is no current generated by the excitation energy.

Figure 7:
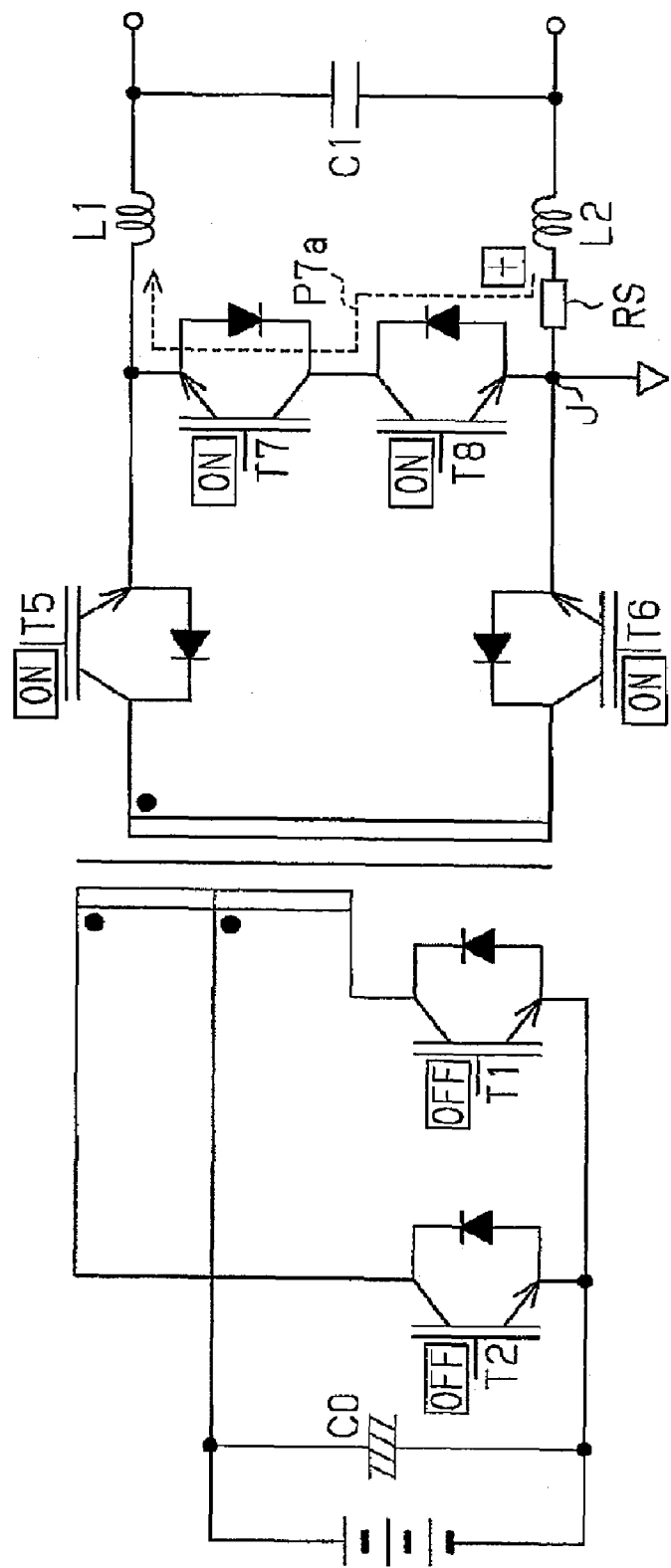
FIG. 7 shows the DC-AC converter of FIG. 3 in operation state (5) during the voltage raising period.

In operation state (5) shown in FIG. 7, the IGBT elements T5 and T6 are activated in a state in which the IGBT elements T7 and T8 are activated. As indicated by the arrow P7b, the current flowing through the coils L1 and L2 continuously flows through the closed circuit formed by the coil L1, the output capacitor C1 and/or the load (not shown), the coil L2, the current sense resistor RS, the anti-parallel diode of the IGBT element T8, and the IGBT element T7. This continuously charges the output capacitor C1 and continuously raises the AC voltage V2. The output current directed toward the output capacitor C1 and/or the load (not shown) flows through the current sense resistor RS. This current is detected.

Figure 8:
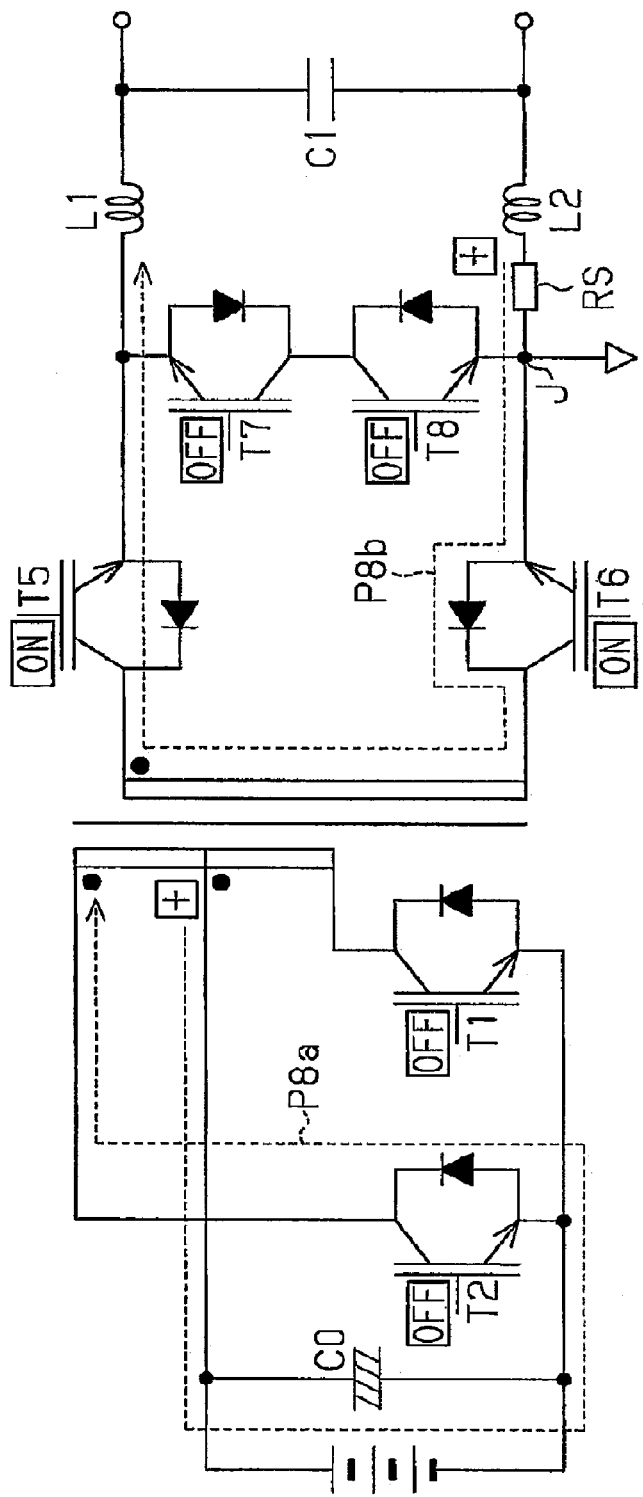
FIG. 8 shows the DC-AC converter of FIG. 3 in operation state (6) during the voltage raising period.

In operation state (6) shown in FIG. 8, the IGBT elements T7 and T8 are deactivated in a state in which the IGBT elements T5 and T6 are activated. As indicated by the arrow P8a, the current flowing through the coils L1 and L2 continuously flows through the closed circuit formed by the coil L2, the current sense resistor RS, the anti-parallel diode of the IGBT element T6, the secondary coil of the transformer TR, the IGBT element T5, the coil L1, and the output capacitor C1 and/or the load (not shown). This continuously charges the output capacitor C1 and continuously raises the AC voltage V2. The output current directed toward the output capacitor C1 and/or the load (not shown) flows through the current sense resistor RS. This current is detected.

When the IGBT element T8 is switched from the activated state to the deactivated state, the collector-emitter voltage of the IGBT element T8 remains unchanged. This is because the anti-parallel diode of the IGBT element T8 is maintained in the activated state. Thus, no switching loss occurs when the IGBT element T8 is deactivated.

Afterwards, the IGBT element T1 is activated. This causes the DC-AC converter to shift from operation state (6) shown in FIG. 8 to operation state (1) shown in FIG. 3. The DC-AC converter raises the AC voltage V2 by repeating the operation states (1) to (6) in this order. The degree by which the AC voltage V2 is raised is changed by adjusting the ratio of the period of operation state (1) shown in FIG. 3 and the period of operation state (4) shown in FIG. 6.

The DC-AC converter maintains the continuity of the current flowing through the coils of the circuit in operation states (5) and (6) shown in FIGS. 7 and 8, that is, during the state transition period from operation state (4) shown in FIG. 6 to operation state (1) shown in FIG. 3. It is preferred that the periods of operation states (5) and (6) be as short as possible.

In the voltage raising period of the AC voltage V2, the period of operation state (1) occupies a sufficiently large portion of a single cycle of the switching control performed with the IGBT elements T1, T2, and T5 to T8 as described above. This accumulates sufficient excitation energy in the coils L1 and L2. Thus, current flows through each of the coils L1 and L2 in the same direction in operation states (2) to (6) that follow operation state (1). This continuously charges the output capacitor C1.

Further, the output current directed toward the output capacitor C1 and/or the load (not shown) always flows through the current sense resistor RS during a single cycle including the states shown in FIGS. 3 to 8. This current is always detected.

The circuit operation of the DC-AC converter in the voltage lowering period of the AC voltage V2 will now be described with reference to FIGS. 9 to 16. FIGS. 9 to 16 show the operations during a single cycle of the switching control of the IGBT elements T1, T2, and T5 to T8 stage-by-stage. The output capacitor C1 is discharged and the AC voltage V2 is lowered by repeating this operation.

Figure 9:
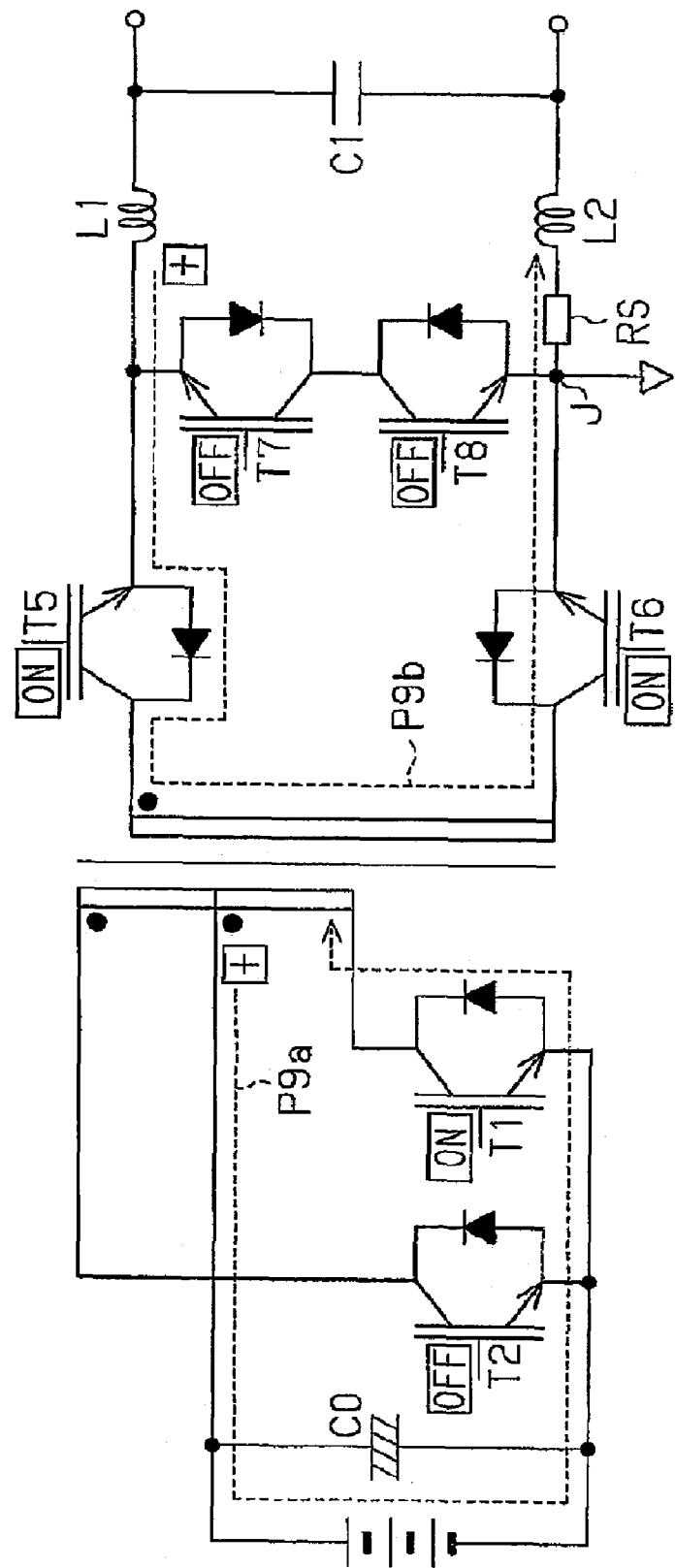
FIG. 9 shows the DC-AC converter of FIG. 3 in operation state (7) of during a voltage lowering period.
Figure 10:
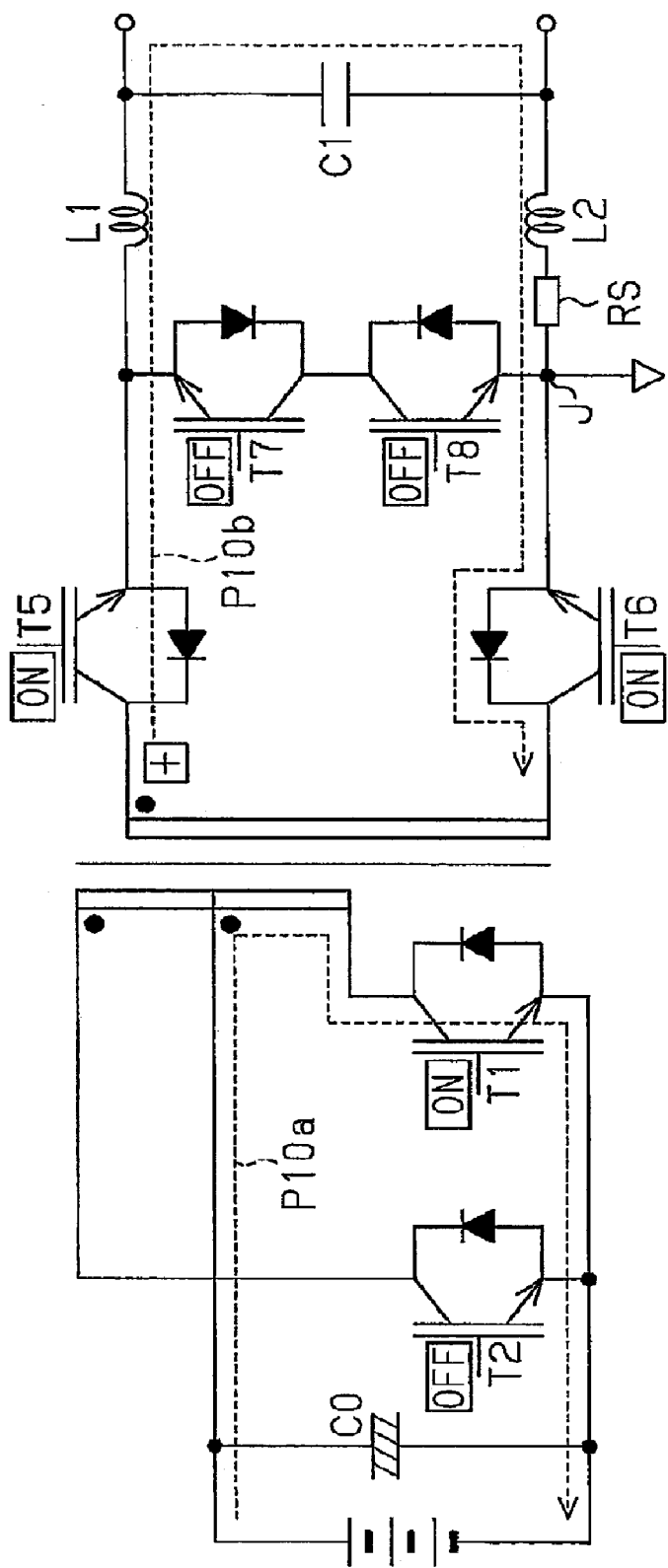
FIG. 10 shows the DC-AC converter of FIG. 3 in operation state (8) during the voltage lowering period.
Figure 16:
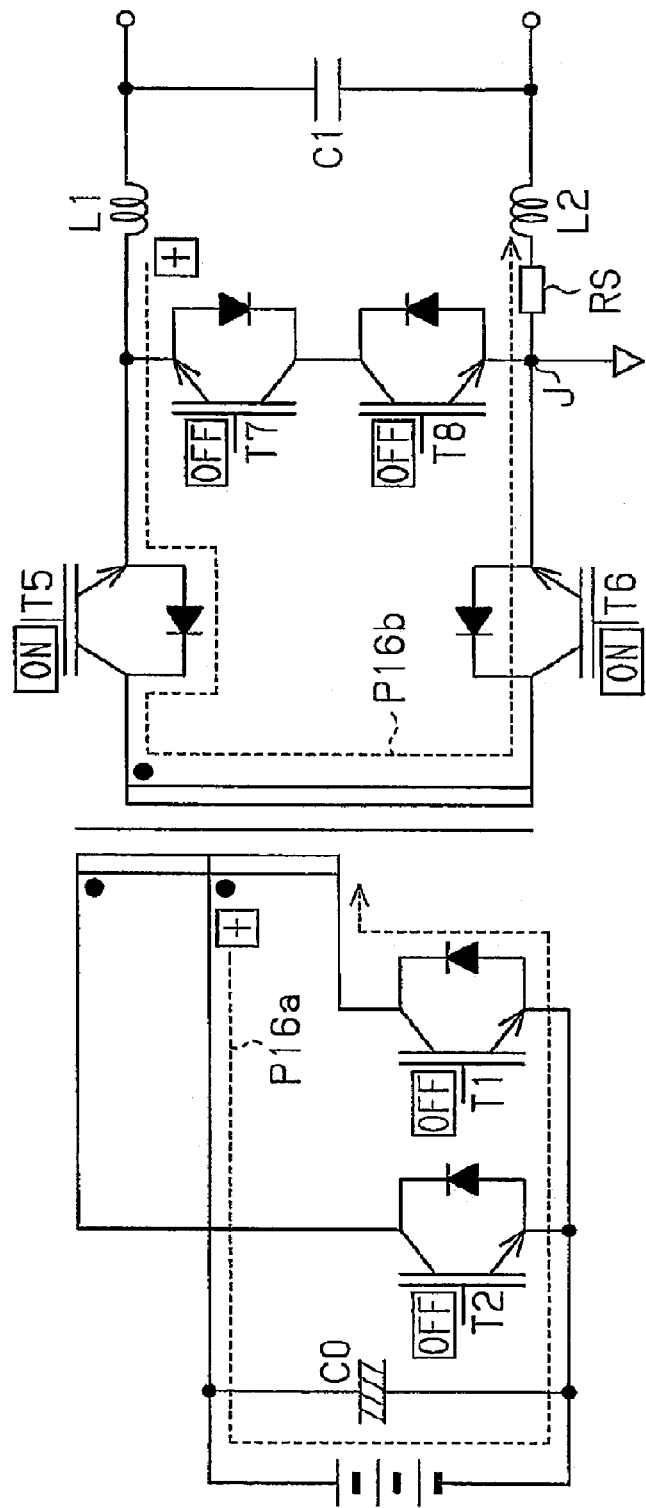
FIG. 16 shows the DC-AC converter of FIG. 3 in operation state (14) during the voltage lowering period.

Operation state (14) shown in FIG. 16 is a state just before operation state (7) shown in FIG. 9. In operation state (14), the IGBT elements T5 and T6 are activated and the IGBT elements T1, T2, T7, and T8 are deactivated. Current flows from the output capacitor C1 through the coil L1, the anti-parallel diode of the IGBT element T5, the secondary coil of the transformer TR, the IGBT element T6, the current sense resistor RS, and back to the coil L2. As a result, the output capacitor C1 is discharged and the AC voltage V2 is lowered. The current from the output capacitor C1 excites the transformer TR. This generates voltage substantially equal to the DC voltage V1 in the primary coil of the transformer TR. As a result, current flows from the center tap of the transformer TR through the power supply of the DC voltage V1 and the anti-parallel diode of the IGBT element T1 as indicated by the arrow P16a. The discharging current of the output capacitor C1 corresponds to the sum of the excitation current of the transformer TR and the current at the primary side of the transformer TR. The discharging current flows from the output capacitor C1 to the current sense resistor RS. This current is detected.

Operation state (7) shown in FIG. 9 immediately follows operation state (14) in which the IGBT element T1 is activated. In operation state (7), the current flowing from the power supply of the DC voltage V1 toward the center tap of the transformer TR starts increasing in the primary coil of the transformer TR. In other words, the primary side current (indicated by the arrow P9a), which flows through the transformer TR immediately before the IGBT element T1 is activated, starts decreasing. This causes the current flowing from a reference terminal of the secondary coil TR toward the coil L1 to start increasing. In other words, the secondary side current (indicated by the arrow P9b) flowing through the transformer TR immediately before the IGBT element T1 is activated starts decreasing. This reduces the decrease of the voltage at the output capacitor C1.

When the activated state of the IGBT element T1 continues, the primary side current and the secondary side current of the transformer TR both continuously increase in the direction described above. As a result, operation state (7) shifts to operation state (8) shown in FIG. 10. As indicated by the arrow P10a, the direction of the primary side current of the transformer TR changes to the direction from the power supply of the DC voltage V1 to the center tap of the transformer TR. In the same manner, the direction of the secondary current of the transformer TR also changes to the direction from the reference terminal of the transformer TR to the coil L1 as indicated by the arrow P10b. The output current directed toward the output capacitor C1 and/or the load (not shown) flows through the current sense resistor RS. This current is detected. However, the directions of the currents may not be changed depending on the current value immediately before the IGBT element T1 is activated or the activation time of the IGBT element T1. The operation will be hereafter described assuming that the current directions have changed in the manner described above.

Figure 11:
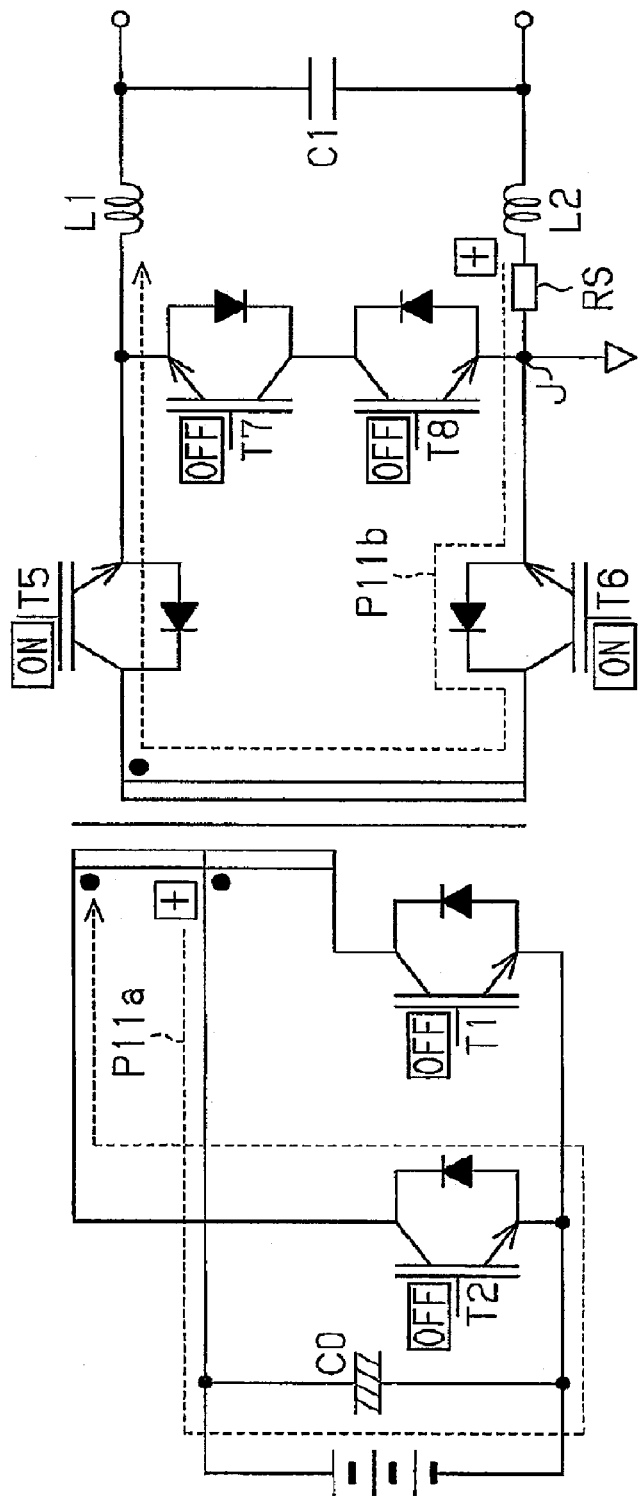
FIG. 11 shows the DC-AC converter of FIG. 3 in operation state (9) during the voltage lowering period.

In operation state (9) shown in FIG. 11, the IGBT element T1 is deactivated. As a result, the continuity of the excitation current of the transformer TR causes excitation current to flow through a path from the center tap of the transformer TR through the power supply of the DC voltage V1, the anti-parallel diode of the IGBT element T2, and back to the primary coil as indicated by the arrow P11a.

At the same time, the continuity of the current flowing through the coils L1 and L2 causes current to flow through a closed circuit formed by the coil L2, the current sense resistor RS, the anti-parallel diode of the IGBT element T6, the secondary coil of the transformer TR, the IGBT element T5, the coil L1, and the output capacitor C1 and/or the load (not shown) as indicated by the arrow P11b. Current superimposed on the current generated by the excitation energy of the transformer TR causes energy to accumulate in the coils L1 and L2. Current determined in accordance with the current generated by the accumulating energy flows through the primary coil of the transformer TR. This regenerates some of the energy accumulated in the coils L1 and L2 so that the regenerated energy is used as the power supply for the DC voltage V1. The remaining energy accumulated in the coils L1 and L2 moves to the output capacitor C1. This continuously charges the output capacitor C1 and continuously raises the AC voltage V2. The output current directed toward the output capacitor C1 and/or the load (not shown) flows through the current sense resistor RS. This current is detected.

Figure 12:
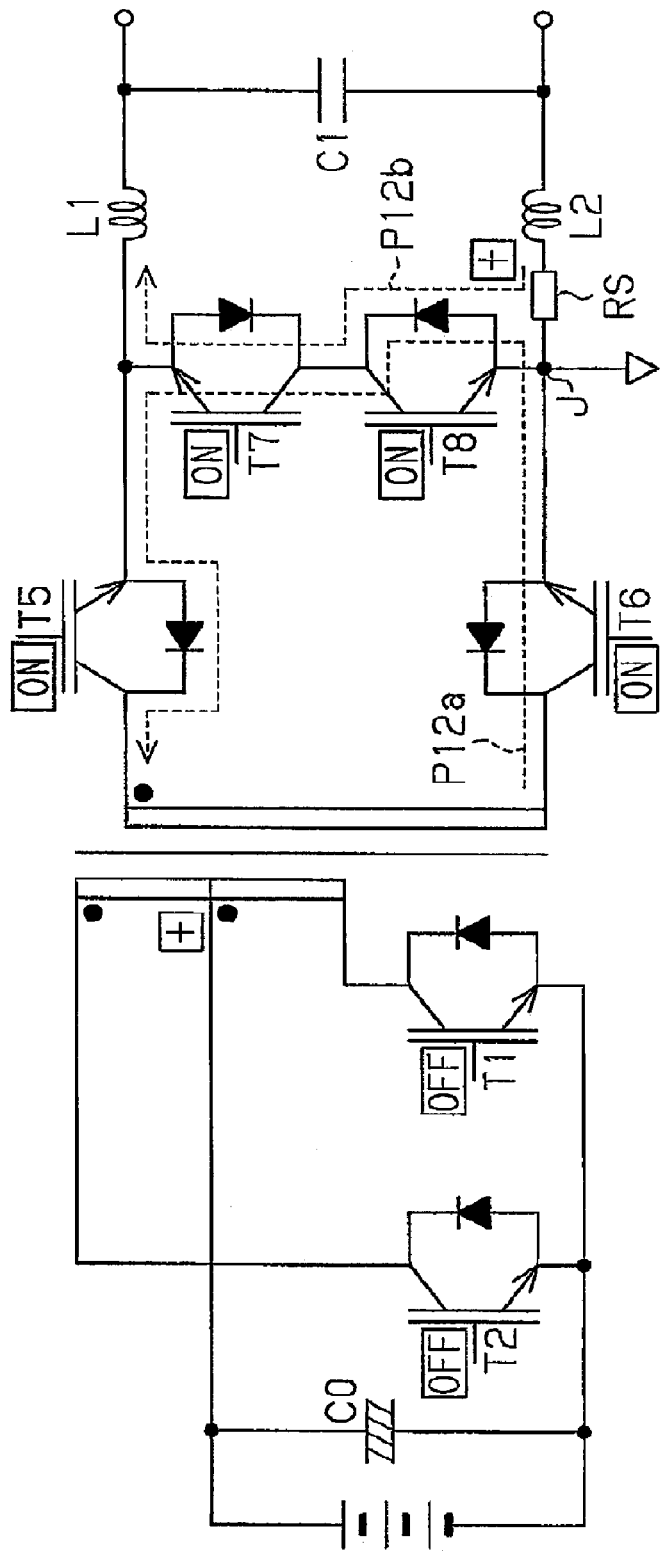
FIG. 12 shows the DC-AC converter of FIG. 3 in operation state (10) during the voltage lowering period.

In operation state (10) shown in FIG. 12, the IGBT elements T7 and T8 are activated in a state in which the IGBT elements T5 and T6 are activated. The coil current flowing from the coil L2 continuously flows to the coil L1 through the current sense resistor RS, the anti-parallel diode of the IGBT element T8 and the IGBT element T7. Some of the energy accumulated in the coils L1 and L2 sequentially moves to the output capacitor C1. This continuously charges the output capacitor C1 and continuously raises the AC voltage V2. The output current directed toward the output capacitor C1 and/or the load (not shown) flows through the current sense resistor RS. This current is detected.

At the same time, the excitation current of the transformer TR flows through the secondary coil instead of the primary coil. More specifically, the excitation current of the transformer TR flows through a path extending from the IGBT element T6 through the anti-parallel diode of the IGBT element T8, the IGBT element T7, the anti-parallel diode of the IGBT element T5, and back to the secondary coil as indicated by the arrow P12a. This is because the activation of the IGBT elements T7 and T8 short-circuits the secondary coil of the transformer TR.

When the IGBT element T8 is switched from the deactivated state to the activated state, the collector-emitter voltage of the IGBT element T8 is maintained to be substantially constant by the anti-parallel diode of the IGBT element T8. Thus, no switching loss occurs when the IGBT element T8 is activated.

Figure 13:
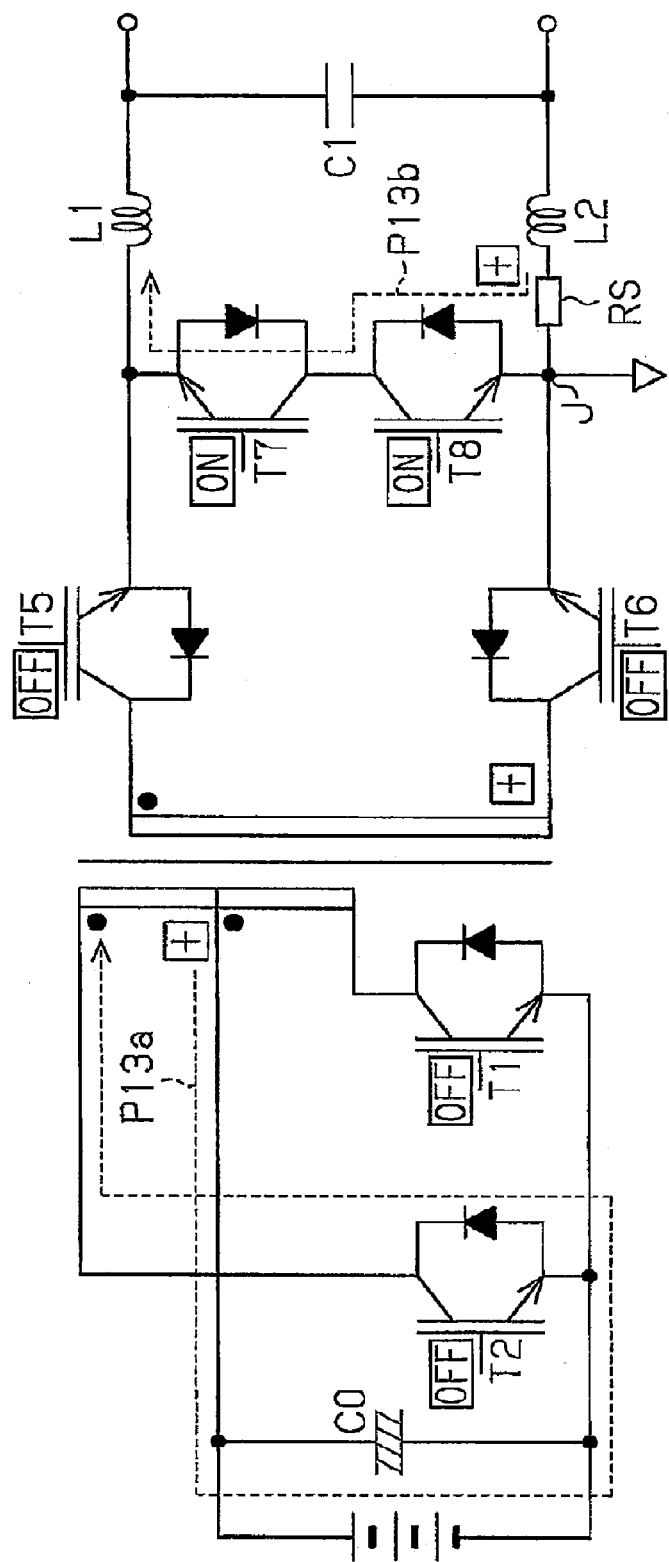
FIG. 13 shows the DC-AC converter of FIG. 3 in operation state (11) during the voltage lowering period.

The DC-AC converter maintains the continuity of the current flowing through the coils of the circuit in operation states (9) and (10) shown in FIGS. 11 and 12, that is, in the state transition period from operation state (8) shown in FIG. 11 to operation state (11) shown in FIG. 13. It is preferred that the periods of operation states (9) and (10) be as short as possible.

In operation state (11) shown in FIG. 13, the IGBT elements T5 and T6 are deactivated in a state in which the IGBT elements T7 and T8 are activated. As indicated by the arrow P13b, the current flowing through the coils L1 and L2 continuously flows through a closed circuit formed by the coil L1, the output capacitor C1 and/or the load (not shown), the coil L2, the current sense resistor RS, the anti-parallel diode of the IGBT element T8, and the IGBT element T7. This continuously charges the output capacitor C1 and continuously raises the AC voltage V2. The output current directed toward the output capacitor C1 and/or the load (not shown) flows through the current sense resistor RS. This current is detected.

The current generated by the excitation energy of the transformer TR flows through a closed circuit extending from the center tap of the primary coil through the power supply of the DC voltage V1, the anti-parallel diode of the IGBT element T2, and back to the primary coil as indicated by the arrow P14b. The transformer TR is reset when there is no current generated by the excitation energy.

When the energy accumulated in the coils L1 and L2 is completely discharged, resonance of the output capacitor C1 and the coils L1 and L2 inverts the direction of the current flowing through the coils L1 and L2. Operation state (11) shown in FIG. 13 shifts to operation state (12) shown in FIG. 14. More specifically, current flows from the output capacitor C1 to the coil L2 via the coil L1, the anti-parallel diode of the IGBT element T7, the IGBT element T8, the current sense resistor RS, and the coil L2. As a result, the output capacitor C1 is discharged. This lowers the AC voltage V2. During the lowering period of the AC voltage V2, in accordance with the load, the period of operation state (11) shown in FIG. 13 is set to be longer than the period of operation state (8) shown in FIG. 10. The discharging current from the output capacitor C1 flows through the current sense resistor RS. This current is detected.

Figure 15:
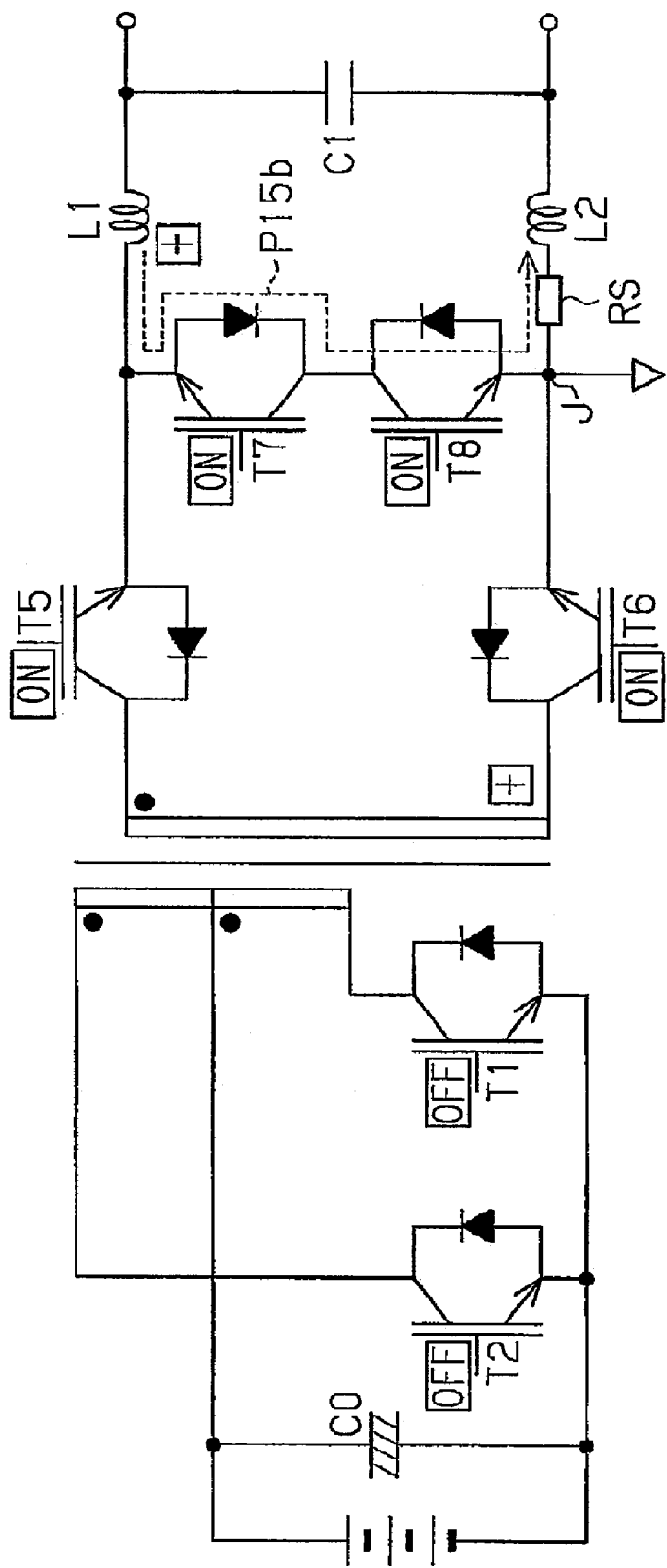
FIG. 15 shows the DC-AC converter of FIG. 3 in operation state (13) during the voltage lowering period.

In operation state (13) shown in FIG. 15, the IGBT elements T5 and T6 are activated in a state the IGBT elements T7 and T8 are activated. This continuously discharges the output capacitor C1 and continuously lowers the AC voltage V2. The discharging current from the output capacitor C1 flows through the current sense resistor RS. This current is detected.

In operation state (14) shown in FIG. 16, the IGBT elements T7 and T8 are deactivated in a state in which the IGBT elements T5 and T6 are activated. The current flowing through the coils L1 and L2 continuously flows through the closed circuit formed by the coil L1, the anti-parallel diode of the IGBT element T5, the secondary coil of the transformer TR, the IGBT element T6, the current sense resistor RS, the coil L2, and the output capacitor C1 and/or the load (not shown). This continuously discharges the output capacitor C1 and continuously lowers the AC voltage V2. The discharging current from the output capacitor C1 flows through the current sense resistor RS. This current is detected.

When the IGBT element T7 is switched from the activated state to the deactivated state, the collector-emitter voltage of the IGBT element T7 does not change. This is because the anti-parallel diode of the IGBT element T7 is maintained in the activated state. Thus, no switching loss occurs during the switching control of the IGBT element T7.

Afterwards, the IGBT element T1 is activated. This shifts the DC-AC converter from operation state (14) shown in FIG. 16 to operation state (7) shown in FIG. 9. The DC-AC converter lowers the AC voltage V2 by repeating operation states (7) to (14) in this order. The degree by which the AC voltage V2 is lowered is changed by adjusting the ratio of the period of operation state (8) shown in FIG. 10 and the period of operation state (11) shown in FIG. 13.

The DC-AC converter maintains the continuity of the current flowing through the coils of the circuit in the operation states (13) and (14) of FIGS. 15 and 16, that is, during the state transition period from operation state (11) shown in FIG. 13 to operation state (7) shown in FIG. 9. It is preferred that the periods of operation states (13) and (14) be as short as possible.

Figure 14:
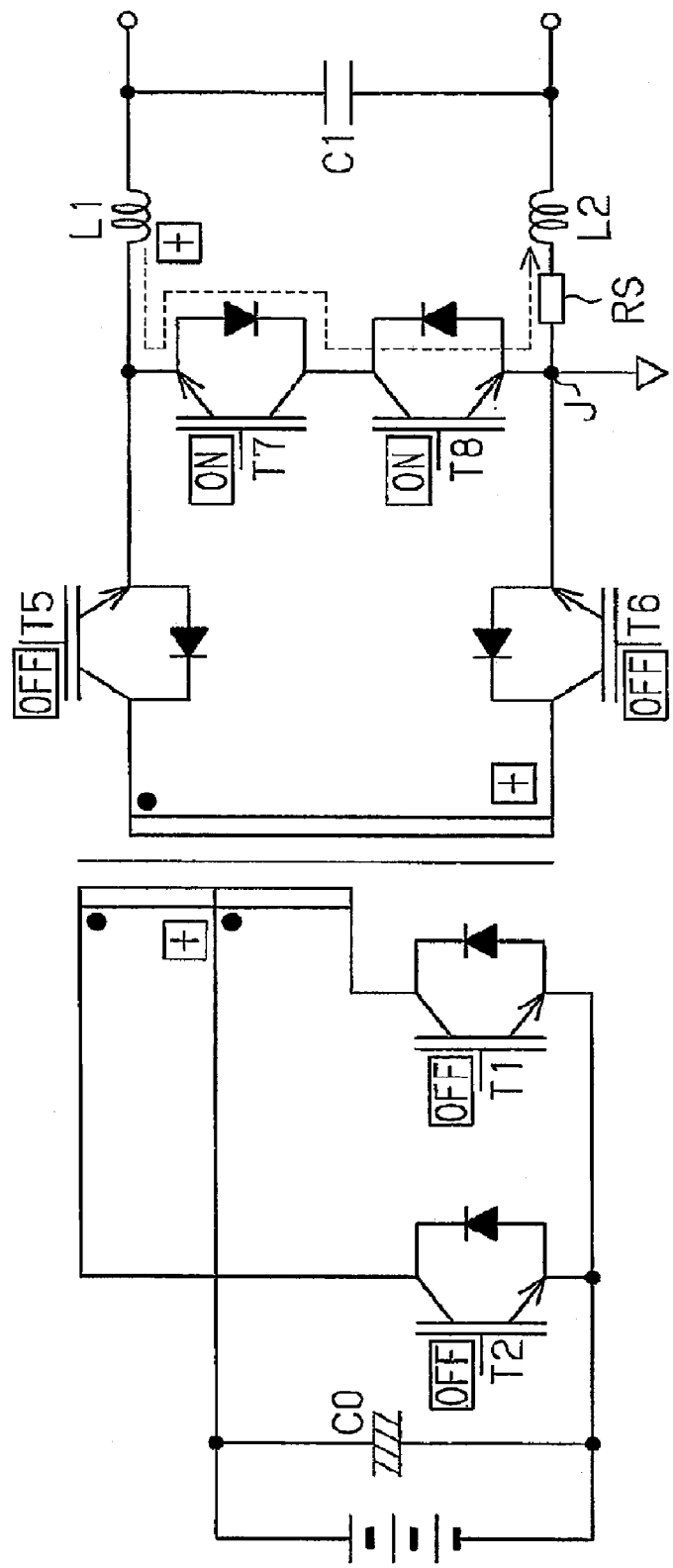
FIG. 14 shows the DC-AC converter of FIG. 3 in operation state (12) during the voltage lowering period.

In the voltage lowering period of the AC voltage V2, the periods of the operation states (11) and (12) shown in FIGS. 13 and 14 occupy a significantly large percentage of a single cycle of switching control of the IGBT elements T1, T2, and T5 to T8. The percentage is set in accordance with the load. This lowers the AC voltage V2.

The timing at which the direction of the coil current flowing through the IGBT elements T7 and T8 between the coils L1 and L2 is inverted from the direction in which the output capacitor C1 is charged with the current to the direction in which the output capacitor C1 is discharged is not limited to the timing of operation state (13) shown in FIG. 15. The direction of the coil current may be inverted at the timing of operation state (7) shown in FIG. 9, the timing of operation state (8) shown in FIG. 10, or the timing in one of operation states (9) to (11) shown in FIGS. 11 to 13 in accordance with conditions such as circuit parameters and time period in operation states (7) and (8) shown in FIGS. 10 and 11. Further, in operation state (8) shown in FIG. 10, the direction of the coil current may be maintained in the direction in which the output capacitor C1 is discharged. In this case, the output capacitor C1 is continuously discharged in all the periods shown in FIGS. 9 to 16, and the AC voltage V2 is continuously lowered.

As described above, the potential at the coil L1 of the output capacitor C1 becomes higher than the potential at the coil L2 of the output capacitor C1 when the IGBT element T1 is activated in the preferred embodiment. The IGBT element T2 may be switched instead of the IGBT element T1. In this case, the potential at the coil L2 of the output capacitor C1 becomes higher than the potential at the coil L1 of the output capacitor C1 when the IGBT element T2 is activated. This enables the AC voltage V2 to be generated.

The output current directed to the output capacitor C1 and/or the load (not shown) and the discharging current from the output capacitor C1 always flows to the current sense resistor RS during a single cycle in each operation shown in FIGS. 9 to 16. Thus, output current is constantly detected.

Figure 17:
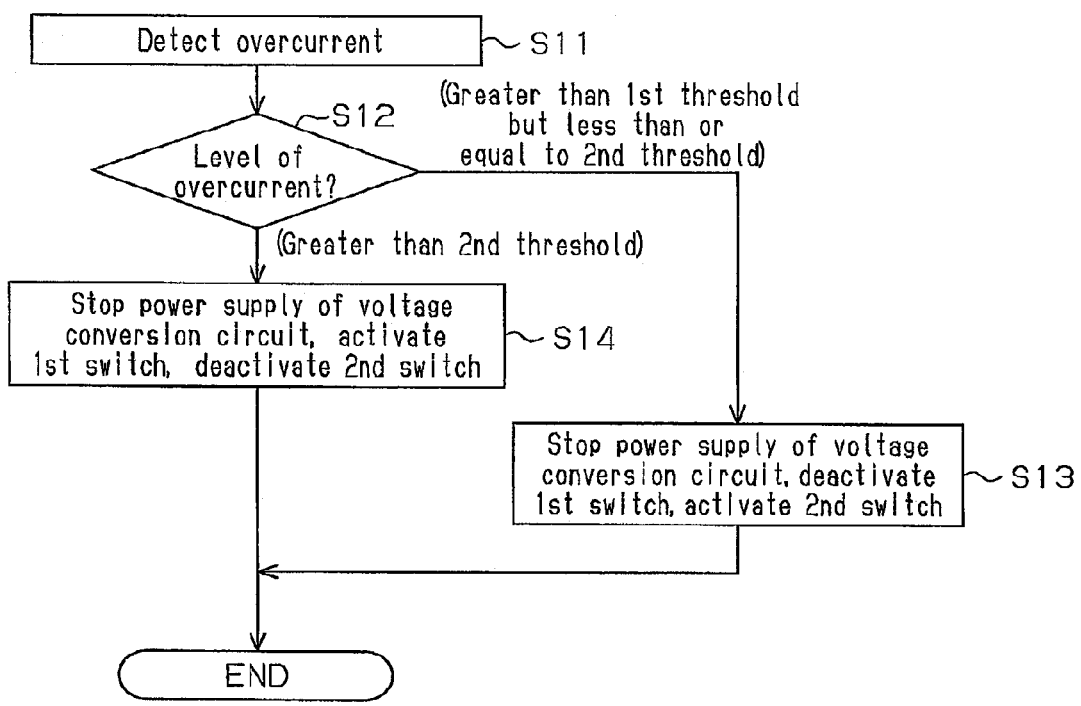
FIG. 17 is a flowchart showing the procedures for protecting the DC-AC converter from overcurrent.

The overcurrent protection method of the DC-AC converter will now be discussed. FIG. 17 is a flowchart showing the method for protecting the DC-AC converter of the present embodiment. This process is performed by the overcurrent protection circuit 5 of the DC-AC converter (FIG. 1). The DC-AC converter will now be described with reference to FIG. 1.

The current sense resistor RS constantly detects the output current flowing through the load, which is connected to the output capacitor C1 and the AC output terminals 20a and 20b. The result of the current detection is input to the overcurrent protection circuit as a current detection signal M. The overcurrent protection circuit 5 determines whether or not the output current is in an overcurrent state. The output current may increase to an abnormal level due to reasons such as an anomaly in the load connected to the AC output terminals 20a and 20b, the occurrence of a short-circuiting, and an anomaly in the output capacitor C1. In such a case, the overcurrent protection circuit 5 determines that the output current is in an overcurrent state in the manner described below.

The overcurrent protection circuit 5 checks overcurrent at two levels, that is, predetermined first and second thresholds. The first threshold is smaller than the second threshold. The first threshold is greater than the current value for a normal state but still provides a certain degree of margin for the current capacity of each component of the DC-AC converter. The second threshold is the current value at which there is practically no margin for the current capacity of the components and is close to the upper limit.

The overcurrent protection circuit 5 compares the current detection signal M, which indicates the output current value, with the first threshold. When the output current is greater than the first threshold, the overcurrent protection circuit 5 determines that the output current is in an overcurrent state. In this state, referring to FIG. 17, the overcurrent protection circuit 5 recognizes the detection of the overcurrent (S11). Upon detection of the overcurrent, the level of the overcurrent is checked (S12). The over current protection circuit 5 compares the current detection signal M, which indicates the output current value, with the second threshold and proceeds to step S14 if the output current is greater than the second threshold. If the output current is not greater than the second threshold, this would indicate that the output current is greater than the first threshold but less than or equal to the second threshold. In this case, the overcurrent protection circuit 5 proceeds to step S13.

In step S13, the overcurrent protection circuit 5 stops supplying power from the input terminals 31a and 31b to the output terminals 32a and 32b in the voltage conversion circuit 1. Further, the overcurrent protection circuit 5 outputs the overcurrent detection signal D to deactivate the first switch 2 and activate the second switch 3. The control circuit 6 generates the control signals C1 to C3 in accordance with the overcurrent detection signal D.

When the supply of DC voltage V1 is stopped, the deactivation of the first switch 2 and the activation of the second switch 3 forms a current path with the filter circuit 4 and the second switch 3. The output current flows through this current path so as to perform an overcurrent protection operation through the energy consumption of the load that decreases the output current (hereafter referred to as commutation mode).

When proceeding to step S14, the overcurrent protection circuit 5 stops supplying power from the input terminals 31a and 31b to the output terminals 32a and 32b in the voltage conversion circuit 1. Further, the overcurrent protection circuit 5 outputs the overcurrent detection signal D to activate the first switch 2 and deactivate the second switch 3. The control circuit 6 generates the control signals C1 to C3 in accordance with the overcurrent detection signal D.

When the supply of DC voltage V1 is stopped, the activation of the first switch 2 and the deactivation of the second switch 3 forms a current path with the filter circuit 4, the first switch 2, and the voltage conversion circuit 1. The output current flows through this current path and is regenerated to the power supply of the DC voltage V1 via the voltage conversion circuit 1 (hereafter referred to as regeneration mode).

The regeneration mode will now be described in detail with reference to FIG. 2. The control signal C1 deactivates the IGBT elements T1 and T2. This stops the supply of DC voltage V1. Further, the control signal C2 activates the IGBT elements T5 and T6, which form the first switch 2, and the control signal C3 deactivates the IGBT elements T7 and T8, which form the second switch 3. This forms a current path with the coil L1, the IGBT element T5 (anti-parallel diode of the IGBT element T5), the secondary coil of the transformer TR, the IGBT element T6 (anti-parallel diode of the IGBT element T6), the current sense resistor RS, the coil L2, the output capacitor C1, and/or the load (not shown). In the regeneration mode, although the direction differs due to the situations, the output current also flows through this current path. The flow of the output current through the secondary coil of the transformer TR transfers power to the primary coil. In accordance with the excitation state of the transformer TR, current flows through a current path formed by the center tap of the primary coil of the transformer TR, the power supply of the DC voltage V1, and the anti-parallel diode of the IGBT element T1 or a current path formed by the center tap of the primary coil of the transformer TR, the power supply of the DC voltage V1, and the anti-parallel diode of the IGBT element T2. Thus, the anti-parallel diodes of the IGBT elements T1 and T2 function as rectifying elements, and power is regenerated at the power supply of the DC voltage V1. The excitation energy accumulated in the coils L1 and L2 are regenerated in the same manner. In other words, the output current decreases more drastically than in the commutation mode. Accordingly, the overcurrent protection operation is performed when the overcurrent is greater than the second threshold, which is greater than the first threshold. This protects the components.

As described above in detail, the current sense resistor RS, which is an output current detection circuit for detecting the output current, is arranged between the connecting point of the IGBT elements T5 and T6 of the first switch 2 and the IGBT elements T7 and T8 of the second switch 3 and the coil L2, which is located at the filter input terminal. Thus, output current flowing through the filter circuit 4 is constantly detected and an overcurrent state is accurately recognized.

In this case, the connecting point J of the first switch 2 (the IGBT elements T5 and T6) and the second switch 3 (the IGBT elements T7 and T8) have a ground potential. This fixes the position of the current sense resistor RS in a potential manner. Thus, the potential does not change greatly regardless of the operation state. This facilitates the detection of a fine voltage from the current flowing through the current sense resistor RS.

In the above overcurrent protection method (FIG. 17), in a state in which the overcurrent is greater than the threshold of the first threshold but less than or equal to the second threshold, when an overcurrent is detected, the supply of the DC voltage V1 is stopped. Further, the activation of the second switch 3 continues the supply of the output current.

In a state in which the overcurrent is greater than the second threshold, in addition to stopping the supply of the DC voltage V1, the excitation energy accumulated in the filter circuit 4 is regenerated to the voltage conversion circuit. This quickly eliminates the overcurrent state.

Figure 18:
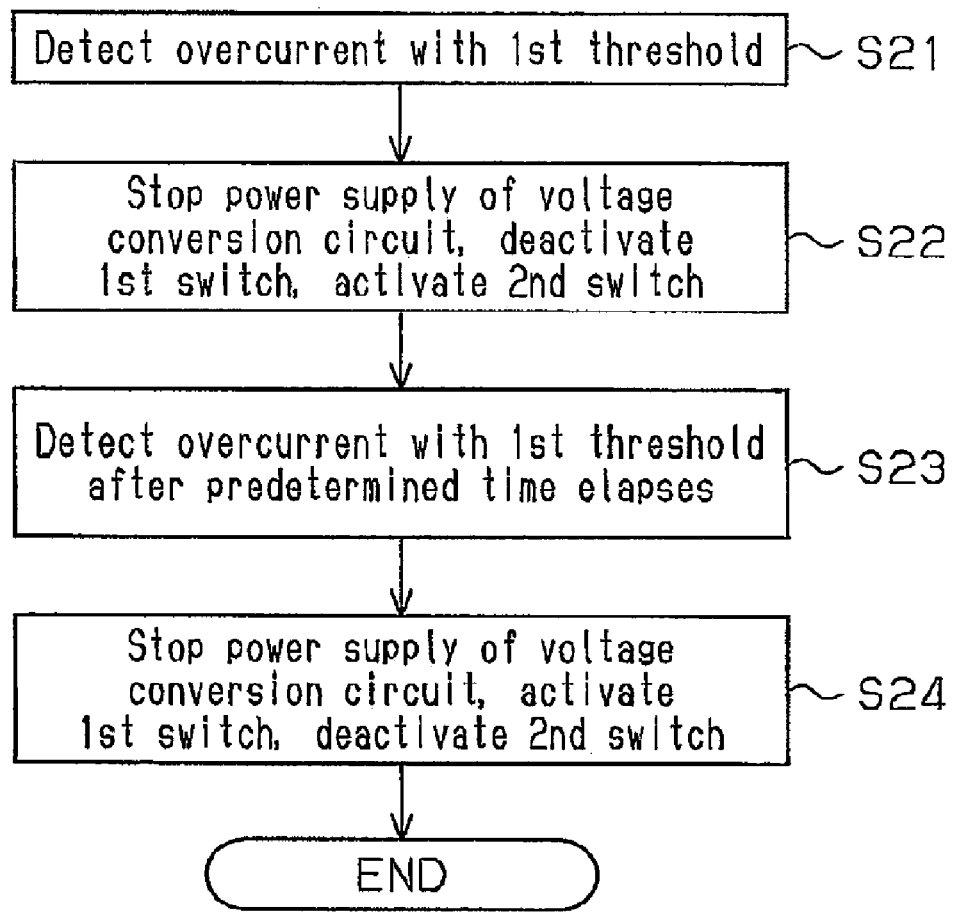
FIG. 18 is a flowchart showing the procedures for protecting a DC-AC converter from overcurrent in a further embodiment of the present invention.

A further embodiment of the present invention will now be discussed with reference to the flowchart of FIG. 18. This embodiment differs from the above embodiment only in the process and operation performed by the overcurrent protection circuit. Like or same reference numerals are given to those components that are the same as the corresponding components of the above embodiment. Such components will not be described in detail.

The overcurrent protection circuit 5 has a predetermined first threshold. The first threshold is greater than the current value for a normal state but still provides a certain degree of margin for the current capacity of each component of the DC-AC converter.

The current sense resistor RS outputs a current detection signal M to the overcurrent protection circuit 5. The overcurrent protection circuit 5 compares the current detection signal M, which indicates the output current value, with the first threshold. When the output current is greater than the first threshold (S21), the overcurrent protection circuit 5 determines that the output current is in an overcurrent state. Then, the overcurrent protection circuit 5 outputs the overcurrent detection signal D to stop supplying power from the input terminals 31a and 31b to the output terminals 32a and 32b of the voltage conversion circuit 1, deactivate the first switch 2, and activate the second switch 3 (S22). The control circuit 6 generates the control signals C1 to C3 in accordance with the overcurrent detection signal D and enters the commutation mode.

When the supply of DC voltage V1 is stopped, the deactivation of the first switch 2 and the activation of the second switch 3 forms a current path with the filter circuit 4 and the second switch 3. The output current flows through this current path. The energy consumption of the load decreases the output current.

While in the commutation mode, after a predetermined time elapses, the overcurrent protection circuit 5 compares the current detection signal M with the first threshold again. If the current detection signal M is greater than the first threshold again (S23), the overcurrent protection circuit 5 outputs the overcurrent detection signal D to activate the first switch 2 and deactivate the second switch 3 while continuously stopping the supply of power from the pair of first input terminals 31a and 31b to the pair of first output terminals 32a and 32b. The control circuit 6 generates the control signals C1 to C3 in accordance with the overcurrent detection signal D and enters the regeneration mode.

When the supply of DC voltage V1 is stopped, the activation of the first switch 2 and the deactivation of the second switch 3 forms a current path with the filter circuit 4, the first switch 2 and the voltage conversion circuit 1. The output current flows through this current path and is regenerated to the power supply of current voltage V1 via the voltage conversion circuit 1.

The output current decreases more drastically than in the commutation mode. Accordingly, this eliminate an overcurrent state even if a predetermined time elapses from when the overcurrent protection operation of the commutation mode starts but the overcurrent state still cannot be eliminated. Although the embodiment illustrated in FIG. 17 and the embodiment illustrated in FIG. 18 have been described separately, the overcurrent protection circuit 5 can be provided with the two overcurrent protections functions of both embodiments. Alternatively, the overcurrent protection circuit 5 may be provided with the overcurrent protection function of the commutator mode.

In the above DC-AC converter, the voltage applied to the filter input terminals 41 is smoothed by the filter circuit 4 and output to the filter output terminals 42. When power is supplied from the voltage conversion circuit 1, the level of the AC voltage V2 at the filter output terminals 42 is controlled by adjusting the ratio of the period during which the IGBT elements T5 and T6 of the first switch 2 is activated and the period during which the IGBT elements T7 and T8 of the second switch 3 is activated. Further, the polarity of the AC voltage V2 at the filter output terminals 42 is controlled by changing the polarity of the voltage output to the conversion circuit output terminals 32a and 32b. Thus, while the input terminals 10a and 10b for direct current is insulated from the output terminals 20a and 20b for AC voltage, DC voltage V1 is directly converted to the desired AC voltage V2.

The current generated from the excitation energy of the transformer TR flows through a closed circuit, which is formed by the center tap of the primary coil, the power supply of the DC voltage V1, the anti-parallel diode of the IGBT element T2, and the primary coil, so that the excitation energy of the transformer TR is regenerated for the power supply of the DC voltage V1. The transformer TR is reset when the regeneration ends and there is no current generated from the excitation energy of the transformer TR.

The first switch 2 is formed by the IGBT elements T5 and T6, which are anti-parallel diodes and have emitter terminals that are connected to each other. The second switch 3 is formed by the IGBT elements T7 and T8, which are anti-parallel diodes and have emitter terminals that are connected to each other. Thus, bi-directional current flow is controlled regardless of the voltage polarity.

The IGBT elements T5 and T7, which have connected emitter terminals, and the IGBT elements T6 and T8, which have connected emitter terminals, may use the same reference potential and the same drive power supply when controlling the flow of current. This simplifies the switching control and the drive power supply.

It should be apparent to those skilled in the art that the present invention may be embodied in many other specific forms without departing from the spirit or scope of the invention. Particularly, it should be understood that the present invention may be embodied in the following forms.

The voltage conversion circuit 1 is not limited to the push-pull circuit formed by the transformer TR having the center tap included in the primary coil. Voltage conversion circuits according to other embodiments of the present invention will now be described.

Figure 19:
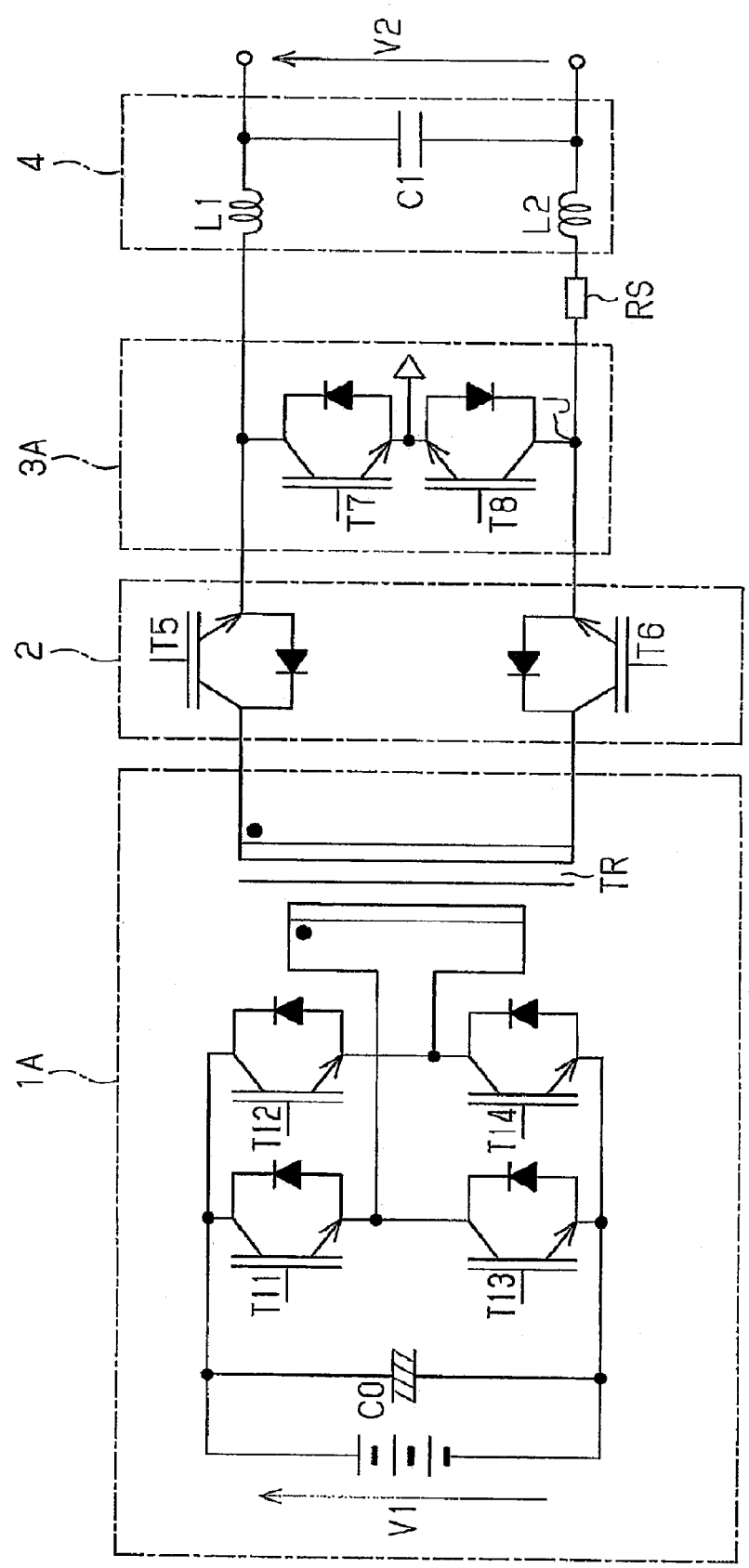
FIG. 19 is a circuit block diagram of a first modification of the DC-AC converter.

FIG. 19 is a circuit block diagram of a DC-AC converter according to a first modification of the present invention. A voltage conversion circuit 1A of the DC-AC rectifier includes a full-bridge circuit formed by IGBT elements T11 to T14.

A primary coil of a transformer TR has a terminal connected to a connecting point between an emitter terminal of the IGBT element T11 and a collector terminal of the IGBT element T13. The primary coil of the transformer TR has another terminal connected to a connecting point between an emitter terminal of the IGBT element T12 and a collector terminal of the IGBT element T14. Collector terminals of the IGBT elements T11 and T12 are connected to each other and to a positive pole of a power supply of a DC voltage V1. Emitter terminals of the IGBT elements T13 and T14 are connected to each other and to a negative pole of the power supply of the DC voltage V1. This forms the full-bridge circuit. The polarity of the voltage applied to the primary coil of the transformer TR is inverted by alternately activating the IGBT elements T11 and T14 and the IGBT elements T12 and T13.

Figure 20:
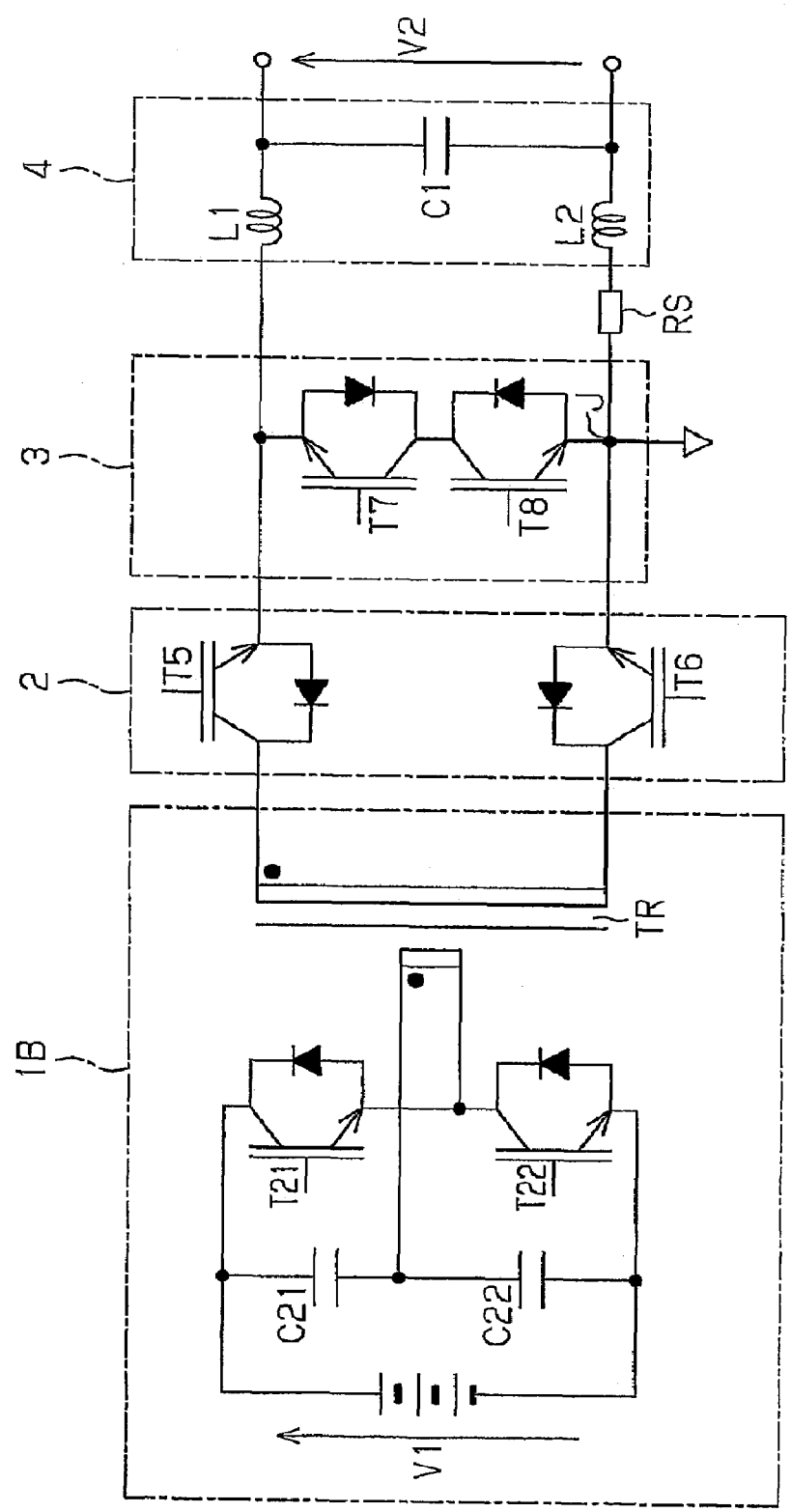
FIG. 20 is a circuit block diagram of a second modification of the DC-AC converter.

FIG. 20 is a circuit block diagram of a DC-AC converter according to a second modification of the present invention. A voltage conversion circuit 1B of the DC-AC converter includes a half-bridge circuit formed by IGBT elements T21 and T22 and capacitors C21 and C22.

A primary coil of a transformer TR has a terminal connected to a connecting point between the capacitors C21 and C22 that are connected in series. The primary coil of the transformer TR has another terminal connected to a connecting point between an emitter terminal of the IGBT element T21 and a collector terminal of the IGBT element T22 that are connected in series. The capacitors C21 and C22 are connected in series between a collector terminal of the IGBT elements T21 and an emitter terminal of the IGBT element T22. The collector terminal of the IGBT element T21 is connected to a positive pole of a power supply of the DC voltage V1. The emitter terminal of the IGBT element T22 is connected to a negative pole of the power supply of the DC voltage V1. This forms the half-bridge circuit. The half-bridge circuit is applicable to a protection circuit and protection method that performs only the commutation mode.

In the present invention, the collector terminals of the IGBT elements T7 and T8 do not have to be connected to each other. Further, the emitter terminals of the IGBT elements T5 and T7 do not have to be connected to each other. Moreover, the emitter terminals of the IGBT elements T6 and T8 do not have to be connected to each other. Other switch structures of the present invention will now be described.

The DC-AC converter of the first modification of the present invention shown in FIG. 19 includes a second switch 3A instead of the second switch 3 (FIG. 3). In the second switch 3A, emitter terminals of IGBT elements T7 and T8 are connected to each other. Thus, the activation and deactivation of the second switch 3A are bi-directionally controllable regardless of the polarity of the voltage. Further, anti-parallel diodes of the IGBT elements T7 and T8 face each other. This enables a path extending through the IGBT elements T7 and T8 to be deactivation. Further, IGBT elements T5 and T6 of a first switch 2 and the IGBT elements T7 and T8 of the second switch 3A form a full-bridge circuit. This structure is preferable since a versatile full-bridge driver may be used to switch the IGBT elements T5, T6, T7, and T8. This structure is further preferable when the emitter terminals of the IGBT elements T7 and T8 are set at a ground potential.

Figure 21:
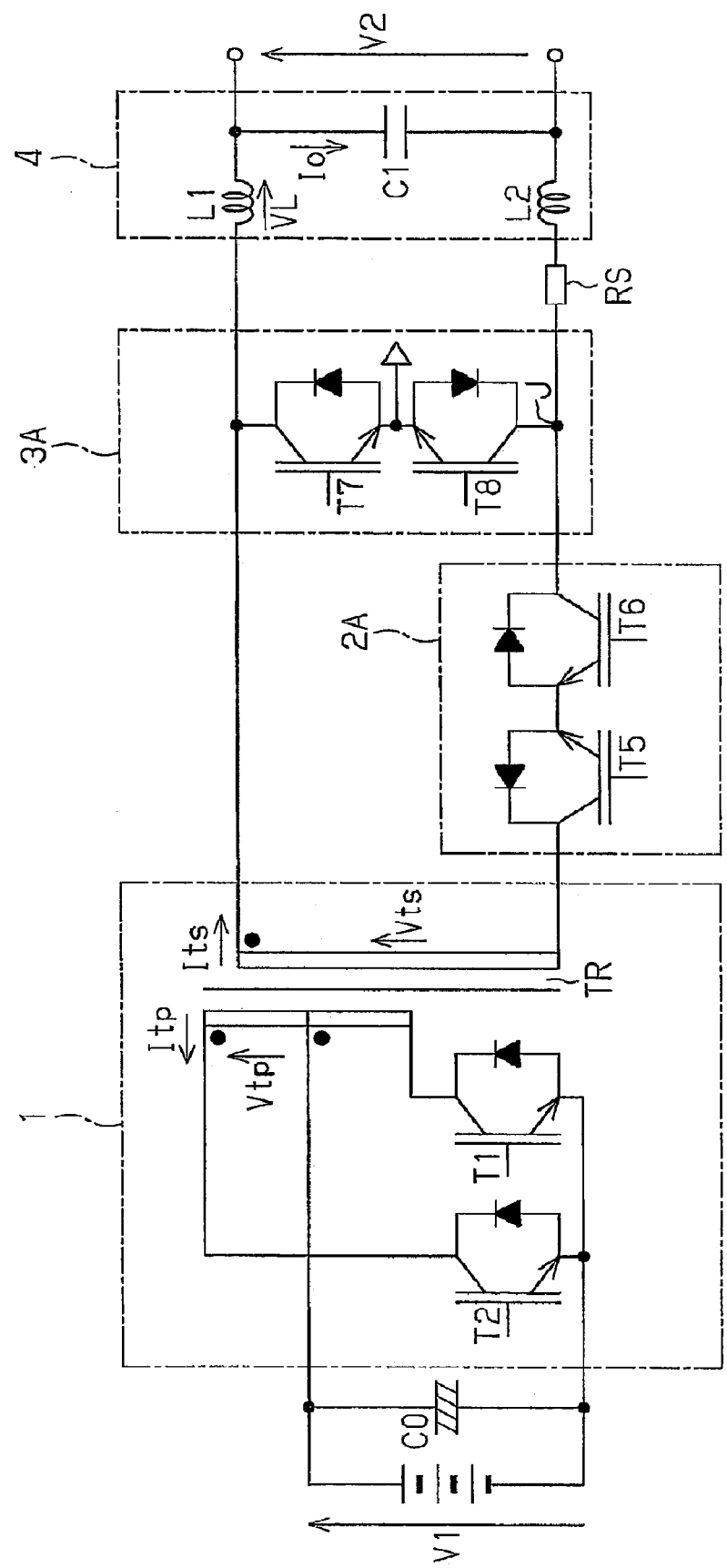
FIG. 21 is a circuit block diagram of a third modification of the DC-AC converter.
Figure 22:
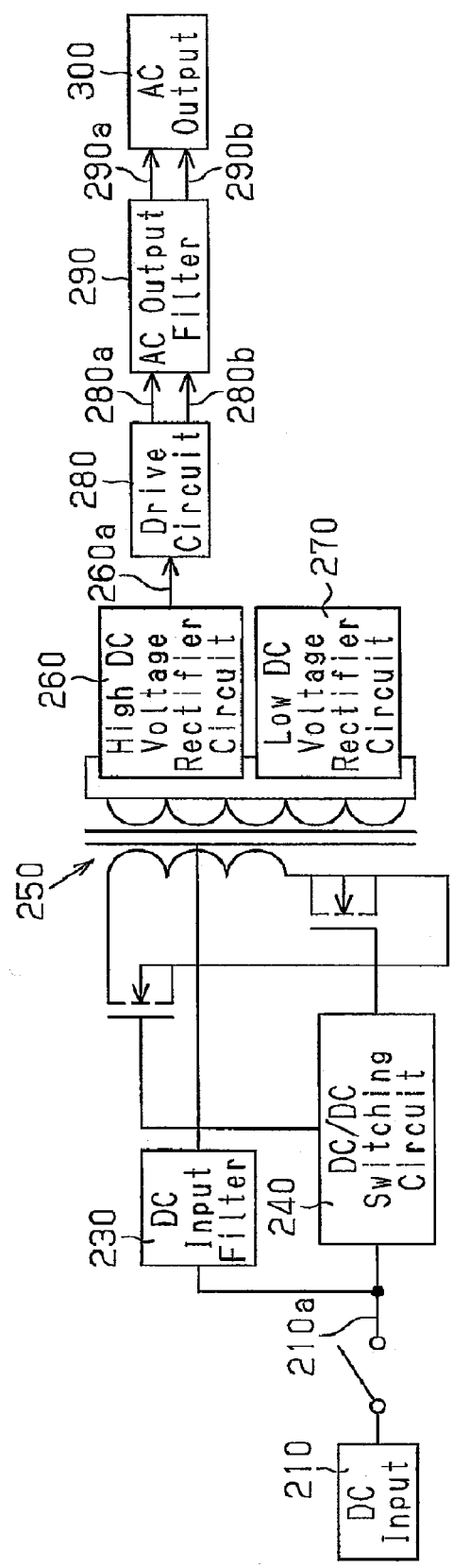
FIG. 22 is a schematic circuit block diagram of a conventional AC inverter.

FIG. 21 is a circuit block diagram of a DC-AC converter according to a third modification of the present invention. The DC-AC converter includes first and second switches 2A and 3A instead of the first and second switches 2 and 3 included in the DC-AC converter shown in FIG. 2. A first switch 2 includes IGBT elements T5 and T6 connected in series with their emitter terminals connected to each other. The IGBT elements T5 and T6 are arranged between one terminal of a secondary coil of a transformer TR and a coil L2. The other terminal of the secondary coil of the transformer TR and a coil L1 are directly connected to each other. The emitter terminals of the IGBT elements T5 and T6 may be set at a common reference potential. This enables a common drive power supply to switch the IGBT elements T5 and T6. Accordingly, the switching control and the drive power supply are simplified.

In the same manner, the second switch 3A includes IGBT elements T7 and T8 of which emitter terminals are connected to each other. This enables the use of a common drive power supply to switch the IGBT elements T7 and T8. Accordingly, the switching control and the drive power supply are simplified.

Further, the emitter terminals of the IGBT elements T7 and T8 are connected to ground. Thus, the drive power supply may be formed using the ground potential as its reference potential.

The present examples and embodiments are to be considered as illustrative and not restrictive, and the invention is not to be limited to the details given herein, but may be modified within the scope and equivalence of the appended claims.

What is claimed:

1. A device for converting DC voltage to AC voltage, the device comprising:
   a voltage conversion circuit including a pair of first input terminals and a pair of first output terminals insulated from the pair of first input terminals, wherein the voltage conversion circuit receives the DC voltage with the pair of first input terminals, converts the DC voltage to voltage having a polarity corresponding to the AC voltage, and outputs the converted voltage from the pair of output terminals;
   a filter circuit including a pair of second input terminals and a pair of second output terminals, wherein the filter circuit receives the converted voltage with the pair of second input terminals, smoothes the converted voltage, and outputs the smoothed voltage from the pair of second output terminals as the AC voltage;
   a first switch arranged between the pair of first output terminals and the pair of second input terminals, wherein the first switch operably connects the voltage conversion circuit and the filter circuit;
   a second switch arranged between the pair of second input terminals;
   an output current detection circuit for detecting overcurrent that is greater than a predetermined first threshold; and
   a protection circuit, wherein when overcurrent that is detected is greater than the first threshold, the protection circuit stops supplying power to the pair of first output terminals from the pair of first input terminals, deactivates the first switch, and activates the second switch.

2. The device according to claim 1, wherein when the output current detection circuit detects overcurrent that is greater than a second threshold, which is higher than the first threshold, the protection circuit stops supplying power from the pair of first input terminals to the pair of first output terminals, activates the first switch, and deactivates the second switch.

3. The device according to claim 1, wherein after a predetermined time elapses from detection of overcurrent that is greater than the first threshold, when the output current detection circuit again detects overcurrent that is greater than the first threshold, the protection circuit activates the first switch and deactivates the second switch while continuously stopping the supply of power from the pair of first input terminals to the pair of first output terminals.

4. A method for protecting a device for converting DC voltage to AC voltage from overcurrent, the device including a voltage conversion circuit, a filter circuit, a first switch, and a second switch, wherein the voltage conversion circuit has a pair of first input terminals and a pair of first output terminals insulated from the pair of first input terminals, receives the DC voltage with the pair of first input terminals, converts the DC voltage to voltage having a polarity corresponding to the AC voltage, and outputs the converted voltage from the pair of output terminals, the filter circuit has a pair of second input terminals and a pair of second output terminals, receives the converted voltage with the pair of second input terminals, smoothes the converted voltage, and outputs the smoothed voltage from the pair of second output terminals as the AC voltage, the first switch is arranged between the pair of first output terminals and the pair of second input terminals and operably connects the voltage conversion circuit and the filter circuit, and the second switch is arranged between the pair of second input terminals, the method comprising the steps of:
   detecting overcurrent that is greater than a predetermined first threshold; and
   when overcurrent that is detected is greater than the first threshold, stopping power supply to the pair of first output terminals from the pair of first input terminals, deactivating the first switch, and activating the second switch.

5. The method according to claim 4, further comprising the step of:
   when overcurrent that is detected is greater than a second threshold, which is higher than the first threshold, stopping power supply from the pair of first input terminals to the pair of first output terminals, activating the first switch, and deactivating the second switch.

6. The method according to claim 4, further comprising the step of:
   after a predetermined time elapses from detection of overcurrent that is greater than the first threshold, when again detecting overcurrent that is greater than the first threshold, activating the first switch and deactivating the second switch while continuously stopping the supply of power from the pair of first input terminals to the pair of first output terminals.

* * * * *